United States Patent [19]

Scharfe, Jr.

[11] 4,013,965

[45] Mar. 22, 1977

[54] CIRCUIT FOR PREVENTING ERRORS IN DECODING INFORMATION FROM DISTORTED PULSES

[76] Inventor: James A. Scharfe, Jr., P.O. Box 267, 627 Fremont Ave., South Pasadena, Calif. 91030

[22] Filed: Feb. 5, 1976

[21] Appl. No.: 655,556

Related U.S. Application Data

[63] Continuation of Ser. No. 494,928, Aug. 5, 1974, abandoned, which is a continuation-in-part of Ser. No. 423,171, Dec. 10, 1973, abandoned.

[52] U.S. Cl. .............................. 325/320; 178/66 R; 178/88
[51] Int. Cl.² ....................................... H04L 27/10
[58] Field of Search ............... 325/320, 30; 178/66, 178/88

[56] References Cited

UNITED STATES PATENTS

| | | | |
|---|---|---|---|
| 2,715,677 | 8/1955 | Turner | 325/320 |
| 2,882,338 | 4/1959 | Wozencraft | 325/320 |
| 2,961,642 | 11/1960 | Lamb | 328/127 |
| 3,348,153 | 10/1967 | Featherston | 178/88 X |
| 3,383,600 | 5/1968 | Calfee | 178/88 X |
| 3,422,357 | 1/1969 | Browne | 178/88 X |
| 3,541,354 | 11/1970 | Basham | 340/347 DA |
| 3,603,820 | 9/1971 | Schuenemann | 307/284 |
| 3,710,140 | 1/1973 | Volmerage | 307/291 |
| 3,863,229 | 1/1975 | Gersbach | 307/284 |

OTHER PUBLICATIONS

Byers, Fast Monostable Multivibrators Using e.c.l. Gates, Electron, Great Britain, No. 9, 7/72.

*Primary Examiner*—Thomas J. Sloyan
*Attorney, Agent, or Firm*—Harold E. Gillmann

[57] ABSTRACT

A converter for converting radio teleprinter audio frequency signals from a radio receiver into teleprinter signals which are bipolar pulses for operating an output device. The converter includes a binary pulse decoder, which may be used independently in other applications, and a pair of substantially identical demodulator channels.

In radio teleprinter applications the novel decoder is coupled to two substantially identical demodulator chanels which demodulate pulses from incoming information signals at audio frequencies. In the demodulator channels the frequencies of the information signals, which commonly are received by the demodulator channels on different audio frequencies, are shifted to the same audio frequency by mixing them with a signal from a respective local oscillator in each demodulator channel. The demodulator channels each detect a series of DC pulses from the audio signals and apply the DC pulses to the decoder.

34 Claims, 4 Drawing Figures

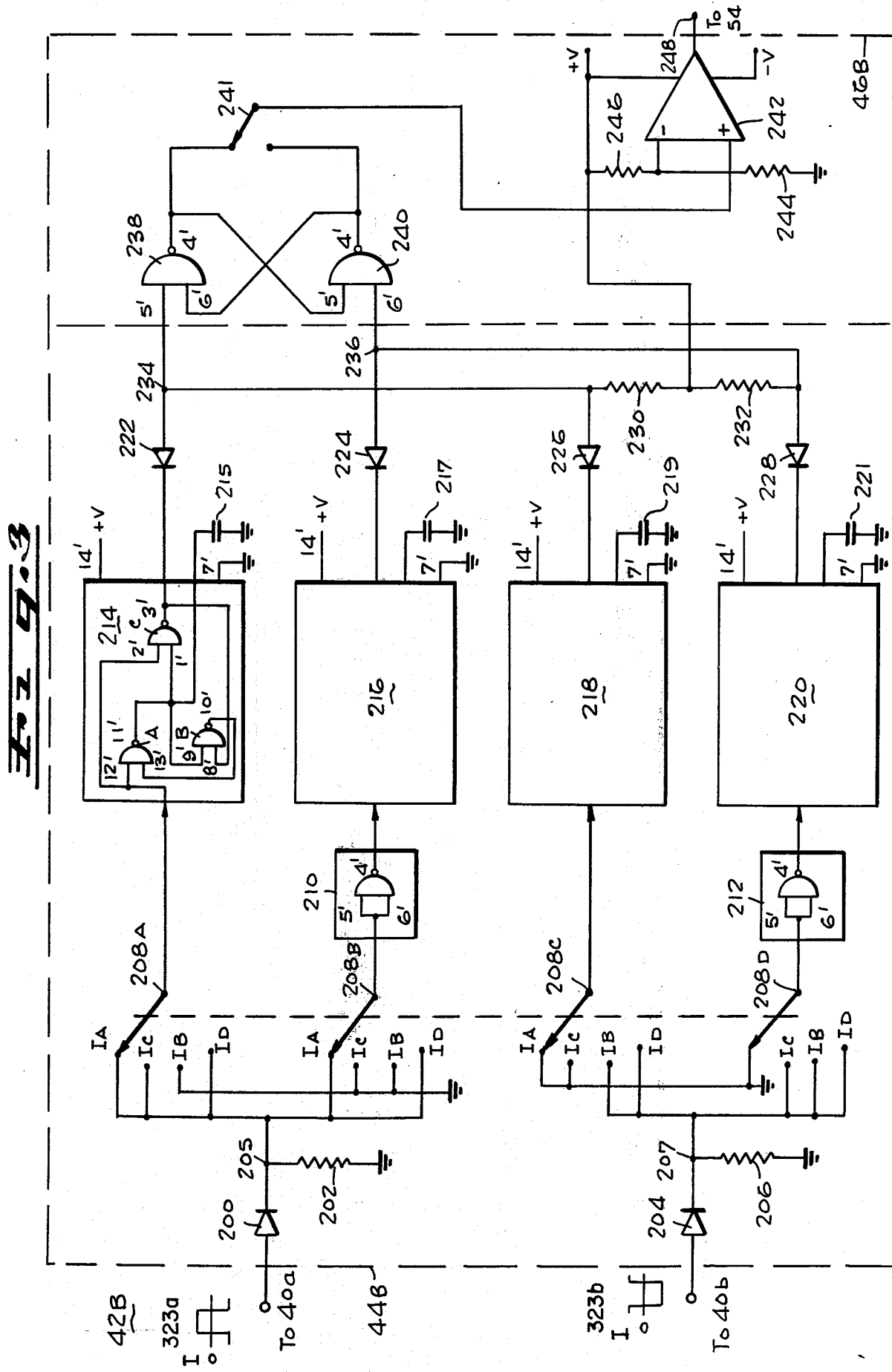

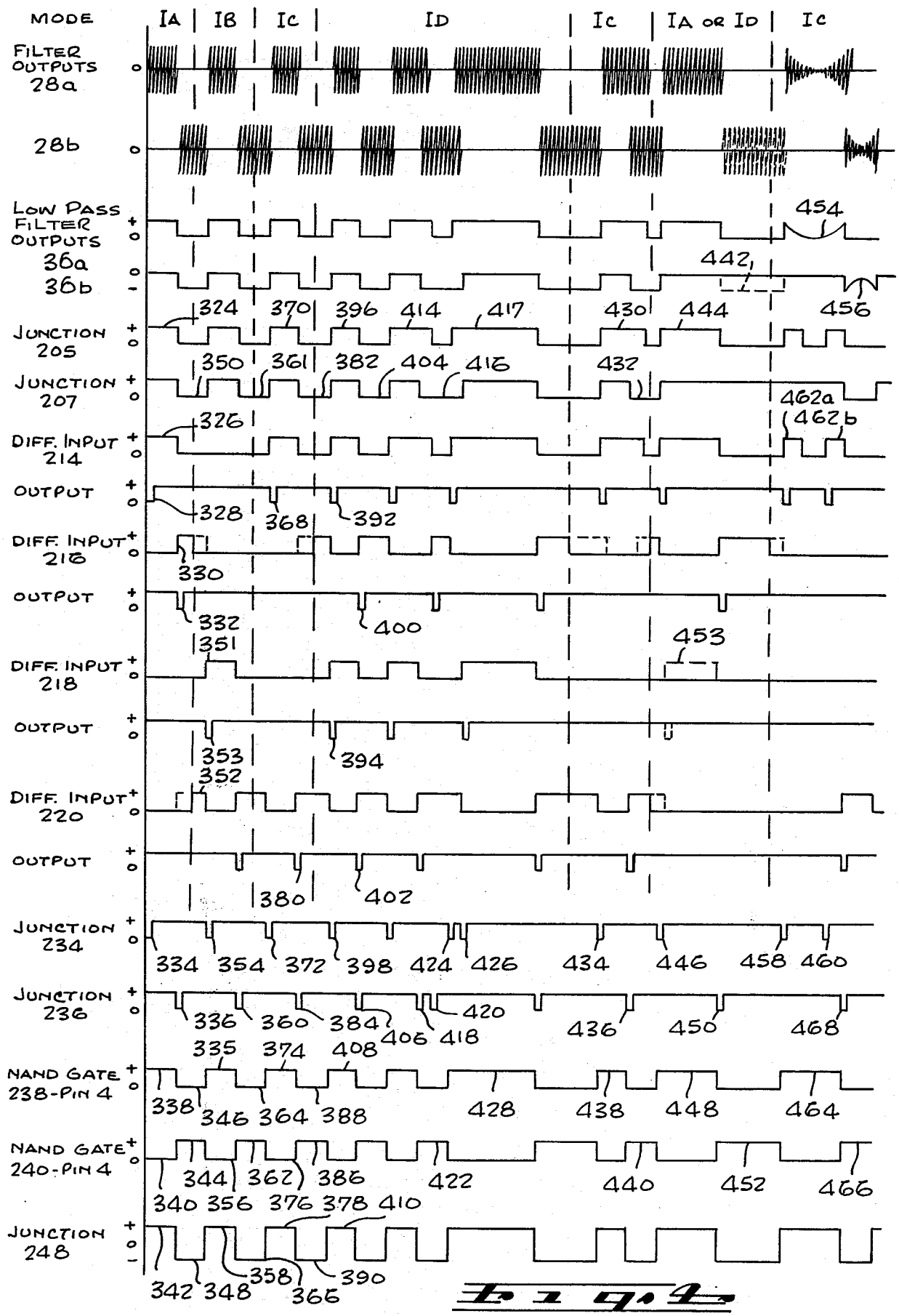

CIRCUIT FOR PREVENTING ERRORS IN DECODING INFORMATION FROM DISTORTED PULSES

CROSS-REFERENCE TO A RELATED APPLICATION

This is a continuation of application Ser. No. 494,928 filed on Aug. 5, 1974, abandoned, which is a continuation-in-part of application Ser. No. 423,171 filed on Dec. 10, 1973, abandoned.

BACKGROUND OF THE INVENTION

This invention relates to the art of decoding information signals received via an information transmission channel such as, for example, a radio, telephone or other communication circuit between distant points. More particularly the invention relates to a means for preventing the introduction of errors in decoding complementary trains of binary signals which are distorted by the transmission channel. The signals used in transmitting information via radio teleprinter channels are an example of complementary series of pulses. These signals are known as "mark" and "space" signals and are complementary because when the mark signal ends, the space signal begins and both the mark and space signals contain the same transmitted information. The radio transmitter emits power during both the mark and space signals but shifts the frequency of the transmitted signal slightly to generate mark and space radio signals at radio frequencies.

Mark and space signals transmitted via a radio communications channel are often distorted by multiple path conditions which are a phenomena of high frequency radio transmission. When multiple path conditions exist, a radio signal transmitted from point A to point B is rexeived at point B via more than one path through the ionosphere. Since the longer paths have a longer transit time, at the point of reception a mark or space signal often appears to have been stretched in time. Also, the mark and space signals sometimes arrive at the reception point out of phase with one another which causes partial or complete phase cancellation of the signals.

A radio receiver converts mark and space signals at two audio frequencies having a predetermined frequency shift between the mark and the space audio signals. An apparatus, commonly called a converter, demodulator, or terminal unit, detects information from both the mark and space signals simultaneously. When phase cancellation occurs, no information or only partial information is detected by the converter. Both stretching of signals due to multiple path conditions and phase cancellation of signals causes an output device, such as a teleprinter which changes signals from a converter to the printed word, to make errors.

More particularly, converters of the prior art receive mark and space signals from a radio receiver in the form of audio tones at two different frequencies with the mark signals having one frequency such as 2125 Hz and the space signals having another frequency such as 2975 Hz. The mark and space tones are processed in separate channels which include a filter in each channel, with one filter designed to pass only tones at the frequency of the space signals and the other filter designed to pass only tones at the frequency of the mark signals. The tones passed by each filter are then coupled to a detector for demodulating, the tones thus resulting in a series of DC signals. The mark and space signals from the detectors are then summed. The combined signals may be coupled either directly to an output device such as a teleprinter. Conventionally a teleprinter includes an electromagnet whose armature movement controls the mechanical printing functions of the teleprinter. The armature responds to a mark pulse by moving in one direction and to a space pulse by moving in the opposite direction. In more sophisticated converters, the combined signal is filtered by a low pass filter which removes carrier frequencies and extraneous noise from the combined signal to produce DC pulses and, in some terminal units, the pulses from the filter are then coupled through a circuit for establishing a varying threshold level of incoming mark and space signals of varying signal strength, such as an automatic threshold corrector or assessor, and then coupled from this circuit to an output device such as a teleprinter.

Converters of the prior art which sum or combine information in the mark and space channels are not capable of providing error-free decoding of mark and space signals which are stretched by multiple path conditions or which are distorted by phase cancellation. When mark and space signals partially overlap one another, these converter units of the prior art detect information energy in both channels simultaneously. The overlapping information is cancelled in the process of summing or combining the mark and space signals. A teleprinter cannot make a correct mark or a space decision because the information needed to make a proper decision has been cancelled in the converter unit. Phase cancellation creates a gap in individual pulses causing one signal to appear as two signals. When operating on such distorted signals, an output device, such as a teleprinter, may print erroneous information or lose its synchronization with the transmitting device and, as a result of loss of synchronization, incorrectly print a number of characters even though only one character was distorted by multiple path propagation conditions.

SUMMARY OF THE INVENTION

The novel converter of the invention overcomes the above and other disadvantages of converters of the prior art by providing a pair of substantially identical demodulator channels for separately demodulating two series of AC signals into two series of DC pulses and a decoder for detecting a change in the binary state of each pulse received from the two demodulator channels and for presenting a binary output signal which remains in one binary state until a change in binary state made by a received pulse is detected. The demodulator channels convert mark and space carrier signals having different audio frequencies to mark and space carrier signals having the same third audio frequency and then etect these mark and space signals at the same third frequency to produce two series of mark and space DC pulses. The two mark and space series of pulses are separately coupled to the decoder for conversion to a third series of binary output pulses.

The decoder comprises a binary level detector for detecting changes in the binary state of pulses in one or two series of pulses and a bistable latching device which is coupled to the binary level detector to receive signals which are representative of the changes in binary state made by pulses in the two series of pulses. The bistable latching device changes the state of its ouput signal only in response to a signal from the binary level detector which indicates that a change in binary state has occurred in the series of received pulses. For example, one change in the binary state of a pulse is a change from a 0 or low level to a 1 or a high level occurring at the leading edge of the pulse. The binary level detector and the bistable latching device comprise a circuit for preventing errors in the process of decoding information contained in a sequence of pulses. The error prevention circuit is referred to herein as a "decoder" for brevity and for lack of a conventional term. The decoder may be used independently in other applications to process two series of pulses.

The decoder normally operates from information obtained by detecting the transition occurring at the leading edge of received pulses. Errors due to the stretching of one or more consecutive pulses are prevented because the leading edges of such pulses upon which the decoder operates are not normally time distorted. A stretched pulse partially overlaps in time the next consecutive pulse. The binary latching device is latched in one binary state by a signal representative of the normally undistorted leading edge of an incoming pulse in one series of pulses and remains in this binary state until switched to the other of its binary state by a signal representative of the normally undistorted leading edge of the next consecutive pulse in the other of the two series of pulses. The binary output signal from the bistable latching device is applied to an output device. The binary output signal is of one binary state or the other for the complete and correct length of each incoming pulse even though a stretched pulse overlaps in time the next consecutive pulse. In radio teleprinter applications the decoder operates on mark and space pulses separately and does not cause a teleprinter to make errors by combining the mark and space signals wherein the mark and space pulses are cancelled for the duration of any overlaps.

In those instances where the leading edge of a pulse is distorted or a pulse is not received in the preferred mode of operation the novel decoder is adapted to operate from information from the transition occurring at the trailing edge of the preceding pulse.

In its preferred embodiment the binary level detector comprises a differentiating means for generating signals which are representative of the change in binary state occurring at the leading edge and occurring at the trailing edge of each received pulse. A differentiating device or circuit produces an output signal only in response to a changing input signal.

The novel decoder of the invention may be operated in any one of five modes of operation. Selection of a mode depends upon the quality of information in the series of pulses being decoded. In what is called the "mark only" mode of operation, the binary level detector generates a pair of signals corresponding to the leading and to the trailing edges of each mark pulse received. These representative signals are coupled to the bistable latching device to control the binary state of the output signal from the bistable latching device. In what is called the "space only" mode of operation, the binary level detector generates a pair of signals representative of the leading and trailing edges of each received space pulse. These space signals from the binary level detector are coupled to the bistable latching device for controlling its output state in the manner discussed above. If either the mark channel information or the space channel information is not received for any reason, that information which is received can be processed in the other of these two modes.

A third mode of operation is described as the "mark-space" mode of operation. In this mode of operation the binary level detector generates signals representative of the changes of binary state occurring at the leading edge of each mark pulse and at the leading edge of each space pulse received from the demodulator channels. A pair of signals representing the leading edges of consecutive mark and space pulses causes the bistable latching device to reverse the state of its output signal twice in the manner described above. The mark-space mode may be used when multiple path conditions cause pulse stretching. Errors due to pulse stretching are greatly reduced, if not eliminated, because the pulses from the binary level detector representative of leading edges of mark and space pulses are not affected by the stretching of the received pulses. Also errors caused by pulses distorted by phase cancellation are greatly reduced in this mode of operation. A single pulse having a gap caused by phase cancellation can appear to the decoding unit as a pair of consecutive pulses or otherwise cause errors. In the mark-space mode of operation, this type of error is greatly reduced because only the leading edges are utilized to control the bistable latching device.

The fourth mode of operation is the preferred mode of operation and is described as the "mark-space diversity" mode of operation. In the mark-space diversity mode of operation the novel converter is adapted to prevent errors due to multiple propagation paths of information signals resulting in the stretching in terms of the transmitted signals and to operate on either the received mark or the space signals or both of them. The capability of a converter unit to operate on either or both the mark or space signals is known as "in-band diversity operation." In the mark-space diversity mode of operation the binary level detector generates signals representative of the leading and trailing edges of each mark pulse and each space pulse received from the demodulator channels. Signals representative of the trailing edge of a mark pulse and the leading edge of the consecutive space pulse are coupled to the latching device to control the switching into one of its stable states. Signals representative of the trailing edge of a space pulse and the leading edge of the consecutive mark pulse are coupled to the latching device to control the switching into the other of its stable states. The first one of either pair of signals to arrive at a corresponding imput terminal of the latching device causes the latching device to change the binary state of its output signal. The second signal to arrive at that same input has no effect on the binary state of the output signal. This fourth mode may be used when multiple path conditions exist because the leading edge information will control the state of the latching device. For example, if a mark pulse is a stretched pulse, the signal representing the leading edge of the next consecutive space pulse will arrive at the bistable latching device first and cause it to change the binary state of its output signal even though the stretched mark pulse has not yet ended. This mode may also be used in the event of selective fading, that is when either the mark or the space information is fading out independently with respect to the other information channel. In the event of selective fading the binary level detector will generate signals representative of the leading and trailing edges of each mark pulse received and of each space pulse received from either one or both demodulator channels where information is present to control the latching device.

In a fifth mode of operation the novel converter is adapted to sum detected mark and space tones and to control an output device with the resulting series of pulses.

In addition the novel converter will process incoming information signals substantially independently of the data rate of these signals.

BRIEF DESCRIPTION OF THE DRAWINGS

FIG. 3 is a schematic diagram showing the preferred embodiment of the novel decoder of the invention; and FIG. 4 is a timing diagram illustrating the operation of the preferred embodiment of the invention.

DESCRIPTION OF THE PREFERRED EMBODIMENT OF THE INVENTION

Figure 1:
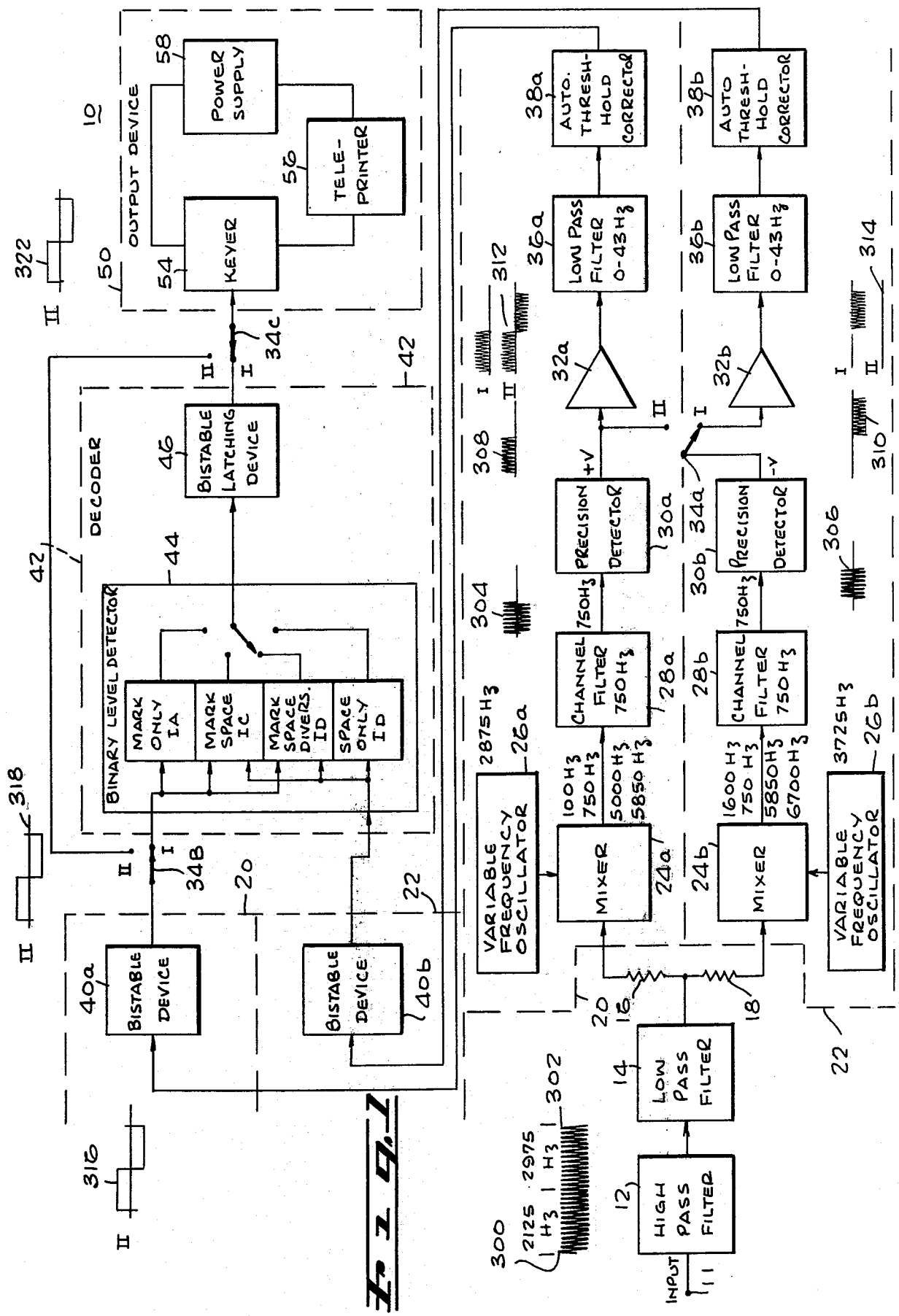
FIG. 1 is a functional block diagram.

There is shown in FIG. 1 a block diagram of a converter or terminal unit which incorporates the novel binary-to-binary decoder of the invention. A converter or terminal unit is a type of equipment used in radio teleprinter services to convert information signals at audio frequencies from a transmission channel to DC pulses for operating an output device such as a teleprinter. The intended application of converter 10 is for conversion of coded teleprinter signals received via a radio transmission and reception channel. Converter 10 would normally receive at input terminal 11 a sequence of binary coded audio signals from a radio receiver (not shown). The sequence of signals normally comprises signals at two frequencies which are complementary pulse trains with successive signals alternating from one frequency to the other. Such signal coding is known as a dual or double-on-off system of coding where a signal at one frequency represents an "on" pulse and a signal at another frequency represents an "off" pulse. In radio teleprinter services the higher of two audio frequencies is usually the space signal and the lower of the two frequencies is usually the mark signal. Numerous dual-on-off codes have been devised for transmitting information. In the Murray code commonly used in teleprinter services each letter of the alphabet, number and various symbols are represented by five bits of information of equal duration proceded by a start pulse and followed by a stop pulse. Each of the five bits is transmitted as a mark or a space signal, the start pulse is transmitted as a space signal and the stop pulse transmitted as a mark signal. The mark and space signals of the code are complementary and each contain the information necessary to identify the transmitted letter, number or symbol. The mark and space signals are complementary in the sence that when a mark signal is being transmitted, the space signal is not, and vice versa. The mark and space signals are detected to produce a sequence of bipolar binary pulses. The bipolar binary pulses are, in turn, decoded to operate an output device such as a printer which reproduces the transmitted information in prined form.

Radio teleprinter communications are described in a publication entitled, "The Teleprinter Handbook," published by The Radio Society of Great Britain, 35 Doughty Street, London WC 1 N 2 AE. This handbook will be referred to herein as "The Teleprinter Handbook." It includes a description of signalling theory, of prior art converters, of teleprinters and other related information.

Mark and space signals received by converter 10 are first filtered by high pass filter 12 and then are filtered by low pass filter 14. The purpose of filters 12 and 14 is to permit the mark and space tones to pass but to eliminate second harmonics of these tones and other undesired interfering signals. The three decibel points of the high pass filter 12 and the low pass filter 14 may be selected at two kilohertz and three kilohertz respectively for commonly used mark and space signal tones. For example, mark and space signals differing by 850 Hz such as 2125 Hertz and 2975 Hertz respectively are in common use. Frequency shifts between the mark and space signal of 170 Hz, 425 Hz or 850 Hz are among the most common frequency shifts in use. Filters 12 and 14 may be omitted if a radio receiver having adequate selectivity is available, i.e. if the radio receiver includes an adequate band pass filter which passes only frequencies in the range of 2–3 Hz.

Filters 12 and 14 neither limit nor clip incoming mark and space signals. Such high pass and low pass filters are well known in the art.

Mark and space signals are coupled from the output of low pass filter 14 through resistors 16 and 18 to separate mark and space channels 20 and 22. Channels 20 and 22 detect the mark and space signals in the incoming sequence of signals to present at their respective outputs direct current signals, i.e. pulses.

High pass filter 12 is preferably an active linear phase RC filter. However, it may be an LC filter. Active RC filters are known in the art. National Semiconductor, 2900 Semiconductor Drive, Santa Clara, California 95051, U.S.A., has published a handbook of linear integrated circuit applications using both monolithic and hybrid circuits entitled "Linear Applications." A high pass active filter which may be utilized as a linear phase filter is shown in FIG. 26 on page AN 5–10 of this handbook. References giving details of the design of such filters are set forth on page AN 5–11 of this handbook.

Mark and space signals, which are audio tones, are coupled from the output of high pass filter 12 to low pass filter 14. Low pass filter 14 may also be an active linear phase RC filter or an LC filter. A low pass active filter is shown in FIG. 25 on page AN 5–10 of the Linear Applications handbook referenced above.

Filters 12 and 14 neither limit nor clip incoming mark and space tones. These linear phase filters are designed for a minimum phase distortion, i.e. for minimum pulse stretching of the pulse input.

Mark and space signal tones present at the output of low pass filter 14 are coupled through resistors 16 and 18 to a pair of virtually identical channels 20 and 22 which detect the envelope of these mark and space signals. Resistors 16 and 18 are a voltage-splitting network and direct both the mark and the space audio tones to channel 20 and to channel 22. Channel 20 detects the envelope of the mark signal tones and channel 22 detects the envelope of the space signal tones. In the preferred embodiment, channels 20 and 22 are separate and identical channels which present separate mark and space output pulses. However, in an alternate mode of operation discussed below the mark and space detected envelopes may be summed and presented at the output of channel 20 as a train of bipolar pulses.

Mixers 24a and b in channels 20 and 22 respectively each comprise a low frequency mixer which produces the sum and the difference of two input frequencies. In the preferred embodiment, mixers 24a and b are identical and are constructed using integrated circuits. A low frequency mixer using integrated circuits is shown on page AN 72–35 of the Linear Applications handbook referenced above. Each of the mixers 24a and b is preferably a full wave mixer. It has been found that a full wave mixer has an improved signal to noise ratio characteristic compared to the performance of a half wave mixer.

Variable frequency oscillators 26a and b are tunable audio oscillators. In the preferred embodiment, oscillators 26a and b are identical and may be constructed utilizing integrated circuits. A tunable audio oscillator is shown on pages LB 16-1 and LB 16-2 in the Linear Applications handbook referenced above.

Each mixer 24 produces output signals at frequencies comprising the sum of the frequency of oscillators 26 and the frequency of each signal coupled from low pass filter 14 and also produces output signals at frequencies comprising the difference between the frequency of oscillator 26 and the frequency of signals coupled from low pass filter 14. Two audio signal tones of different frequencies will normally be coupled to both mixers 24 from low pass filter 14. Therefore, each mixer 24 will produce signals having four different output frequencies. The oscillator 26a in the mark channel 20 is tuned to a frequency which has a predetermined difference with respect to one of the incoming audio signal tones from low pass filter 14. Assuming that the incoming signal tones comprise mark signal tones at 2125 Hz and space signal tones at 2975 Hz, the variable frequency oscillator 26a will be adjusted to 2875 Hz. Mixer 24a in channel 20 will thus produce a difference signal of 750 Hz plus other undesired output signals. Similarly, oscillator 26b in space channel 22 is adjusted to a frequency having a predetermined difference with respect to the other of the incoming audio tones from low pass filter 14. For a space signal tone of 2975 Hz this oscillator 26b is adjusted to 3725 Hz. Mixer 24b produces an output signal of 750 Hz plus other undesired tones. The frequencies of oscillators 26a and 26b are selected to be above the frequency passed by the filters thus keeping mixer product frequencies and spurious radiations out of the channel filters.

At this point both mixers 24a and 24b produce output signals having a frequency of 750 Hz plus other output signals. It is to be noted, however, that the output of mixer 24a which has a frequency of 750 Hz is an intermediate signal representative of the mark audio signal tones. The output signal of mixer 24b which also has a frequency of 750 Hz is an intermediate signal representative of the space signal tones. In other words, the incoming mark and space signal tones received by high pass filter 12 have been shifted to the same lower frequency of 750 Hz by mixers 24a and 24b.

Filters 28a and 28b in channels 20 and 22 separate the desired frequencies present in the output signals of mixers 24a and 24b, respectively, by passing only a narrow band pass of frequencies around 750 Hz. In the preferred embodiment, each filter 28 has a band pass of approximately 150 Hz for 75 baud operation. A signal speed of 75 baud is a speed of approximately 100 words per minute for information signals transmitted in the Murray code. A baud is conventionally defined as the shortest signal unit in a signal code and may be expressed as the reciprocal of the time of the shortest signal element in a code. Chapter 1 of the Teleprinter Handbook explains teleprinter signalling and the necessity for taking signal speed into account in designing circuits for teleprinter converters. The 150 Hertz bandwidth of filters 28a and 28b is adequate to pass signals coded in either the five-level Murray code or in the eight-level American Standard Code for Information Interchange (ASCII) code used in computer and data processing systems.

Oscillators 26a and b can, of course, be adjusted to produce a wide range of difference frequencies. The output frequencies of oscillators 26a and b may each be adjusted to produce difference signals from mixers 24a and b having a common predetermined frequency, such as for example 750 Hz, regardless of the particular frequencies of the incoming mark and space information signals.

The frequency of the identical channel filters should be selected below the 3 decibel point of the high pass filter 12 to keep undesired signals from receiver and wide band noise from passing through them. Each filter 28 is a linear phase narrow band pass filter. Filters 28a and 28b are preferably identical and are constructed utilizing integrated circuits. Band pass active filters utilizing integrated circuits are shown on pages AN 72-15 through AN 72-18 in the Linear Applications handbook referenced above. A converter unit which utilizes active band pass filters for separating mark and space audio tones is described in an article entitled "RTTY Demodulator with good Dynamic Range" published in the December 1973 issue of RTTY Journal, Post Office Box 837, Royal Oak, Michigan, U.S.A., Volume 21, No. 10, pages 3–7 and page 20. The band pass filter shown therein utilizes an operational amplifier with an RLC circuit as the feedback impedance. These active filters are known as channel filters as they are designed to pass the mark tones in one filter and space tones in the other filter.

In order to maintain a real time relationship between signals in the mark and space channels 20 and 22 the respective mark and space mixers 26a and b and channel filters 28a and b should present the same time delay amplitude response and propagation characteristics to both the mark and space signals. A simple means to accomplish this is to use two identical filters for the mark and space channel filters 28. Linear phase (Bessel function) filters are utilized to minimize time delay and phase distortion. Linear phase filters are described in Sections 8–24 and 21–8 of the Fifth Edition of a handbook entitled "Reference Data for Radio Engineers" published by Howard W. Sams & Co., Inc., Indianapolis, Inc./Kansas City, Mo./New York City, N.Y.-/U.S.A.

The output signals from channel filter 28a comprise mark signals tones at a frequency of 750 Hz. Similarly, the output signals from channel filter 28b comprise space signal tones at a frequency of 750 Hz. The output signals from channel filter 28a and 28b are coupled to respective precision detectors 30a and 30b, respectively.

Each one of detectors 30a and b may be any known type of detector for detecting the envelope of incoming information signals, such as a diode detector. In the preferred embodiment detectors 30a and 30b are precision detectors utilizing integrated circuits. A precision detector may utilize an operational amplifier and a pair of diodes with one diode being connected in the output circuit and one diode in the feedback circuit of the operational amplifier. When the input to the operational amplifier is negative, the output becomes positive and the diode in the output circuitry has a polarity such that it is caused to conduct. Because of the high gain of the operational amplifier only a very small input voltage is needed to overcome the forward voltage drop of the diode. When the input voltage to the operational amplifier is positive, the output is negative and the diode in the feedback circuit conducts. When the diode in the feedback circuit is conducting, the diode on the output circuit is cut off. Therefore rectification of the input signal has been accomplished.

A precision detector is described in the abovementioned article in the December 1973 issue of the RTTY Journal and on page LB 8-1 of the Linear Applications handbook referenced above.

The output signals of precision detector 30a comprise a series of positive pulsating DC signals corresponding to mark signal tones. The output signals from precision detector 30b are negative pulsating DC signals corresponding to space signal tones.

Output pulses from precision detector 30a are coupled to operational amplifier 32a in channel 20. Output pulses from precision detector 30b are coupled to the contacts of Section A of mode switch 34. With the mode switch 34 in the mode I position, output pulses from precision detector 30b are coupled to operational amplifier 32b in space channel 22. With the mode switch in the mode II position output pulses from precision detector 30b are coupled to operational amplifier 32a in the mark channel 20. Assume that mode switch 34 is in the mode I position, Modes I and II are discussed below.

Operational amplifiers 32a and b each comprise a conventional linear integrated circuit amplifier utilized for providing gain and for summing signals. It may be a Type 741 operational amplifier made by several manufacturers. Operational amplifiers are described in pages AN 20-1 through AN 20-12 of the Linear Applications handbook referenced above. Use of an integrated circuit amplifier for summing two signals avoids losses inherent in other means for combining two signals used in the prior art.

The output pulses from operational amplifiers 32a and 32b are coupled to low pass filters 36a and 36b respectively. Low pass filters 36a and 36b remove the carrier and noise components present in the pulses. In the prior art, low pass filters were traditionally designed with Butterworth characteristics which have a very fast roll off characteristic. For 75 baud and lower data rates these filters were usually set at the theoretical optimum roll off point of 37.5 Hz. In the preferred embodiment linear phase (Bessell function) filters of the type described above are used because they are not subject to the adverse characteristics of unequal group delay, overshoot and transient response as are Butterworth filters. Since linear phase filters have a much more gradual roll off characteristic, it has been determined that the three decibel roll off point is set at 43 Hz to achieve minimum error rate at a data rate of 75 baud or less. The theory of the use of a low pass filter in radio teleprinter converters is discussed in an article entitled "Filters for RTTY" published in the May 1964 issue of the RTTY Journal.

The output pulses from low pass filters 36a and 36b are coupled to automatic threshold correctors 38a and 38b respectively. Automatic threshold correctors 38a and 38b are optional and are required only if in-band diversity operation is desired. In-band diversity operation is discussed below.

Automatic threshold correctors 38a and 38b are used in the mark and space channels to keep the zero threshold of the next stage of the channel (bistable devices 40a and 40b, respectively) "centered" around the maximum and minimum levels of the signals received by these devices.

Each one of the automatic threshold correctors 38a and b is preferably of the "precision" type wherein amplifiers continuously drive diodes above their threshold levels. The time constant of the automatic threshold corrector must be carefully chosen for a good trade off between the baud rate and the fade rate that is typically encountered in high frequency radio propagation. By empirical methods this has been determined to be between 150 and 250 milliseconds.

An automatic threshold corrector of the precision type is shown in an article entitled "Variable-RTTY Terminal Unit" published in the November 1973 issue of Ham Radio Magazine, Greenville, New Hampshire, U.S.A. 03048 on page 19.

Threshold correctors are well known in the art of demodulating frequency shift keyed signals. In conventional terminal units the determination of the presence of a mark or a space signal is made by a circuit which decides whether the output of a mark channel filter is greater or less than the output of a space channel filter. The usual means for making such decisions is a circuit which combines the output of a mark channel filter with the output of a space channel filter and then decides which signal is present on the basis of the combined signal. Such a system produces errors when fading occurs on either the mark signals or the space signals. Any decision circuit which has a fixed threshold for determining the existence of the mark or space signal is subject to error when fading occurs on either the mark or the space frequency. When selective fading occurs on either the mark or the space frequency, shifting of the decision threshold approximately half-way between the maximum amplitude peaks of the remaining received signal removes the probability of error because the data transmitted on the mark and space frequencies are complementary. That is, error need not occur unless signals on both frequencies fade completely at the same time.

A theoretical analysis of fading signals disturbed by noise and a description of a demodulator are set forth in an article entitled "Frequency Diversity in the Reception of Selectively Fading Binary Frequency-Modulated Signals" published in the Proc. IEE (London) 104B (1957), pages 98.110.

Automatic threshold correction techniques are described in a paper entitled "An Improved Decision Technique for Frequency-Shift Communications Systems" by Elmer Thomas which was published in the Proceedings of the IRE, Volume 48, No. 12, December, 1960. An automatic threshold corrector is disclosed in U.S. Pat. No. 2,999,925. Although an automatic threshold corrector of the type using diodes as disclosed in U.S. Pat. No. 2,999,925 might be utilized, it is preferable to use an automatic threshold corrector of an active type which incorporates an integrated circuit for driving diodes continuously and thus avoiding a problem with the threshold level of diodes.

Positive output pulses from atuomatic threshold corrector 38a are coupled to bistable device 40a in the mark channel 20. Similarly, negative output pulses from automatic threshold corrector 38b are coupled to bistable device 40b in space channel 22. It is to be understood that the polarity of DC pulses throughout the mark and space channels 20 and 22 are merely a matter of design choice and that pulses in the mark and space channels of the same or opposite polarity, with positive pulses in the space channel and negative pulses in the mark channel, could be selected just as well.

Alternatively, assessor circuits may be substituted for automatic threshold correctors 38a and b. An assessor circuit is shown and described on page 102 of the article entitled "Frequency Diversity in the Reception of Selectively Fading Binary Frequency Modulated Signals" which is referenced above.

Each one of bistable devices 40a and b restores the shape of received pulses to square waves. Bistable devices 40a and b operate according to well known logic. The output signal of each is a binary signal in either one binary state or the other and an input voltage exceeding a predetermined threshold will produce a saturated output voltage of one polarity. When the input voltage to a bistable device drops below the threshold value, the output voltage switches to the opposite polarity. Assume a positive input voltage to bistable device 40a produces a positive output voltage. Also assume a negative input voltage to bistable device 40b also produces a positive output voltage. Where an integrated circuit is utilized in the construction of each one of bistable devices 40a and b, the polarity of the output voltage may be inverted or not with respect to the polarity of the input voltage merely by selecting the inverting or non-inverting input terminal of the integrated circuit.

Integrated circuits used as bistable devices in this application are frequently DC limiter circuits which are also known as slicers. A slicer is described below. The above-mentioned converter disclosed in the December 1973 issue of RTTY Journal includes a slicer. The Teleprinter Handbook referenced above describes a slicer on page 5.21 and shows a diagram of the slicer on page 5.20.

Instead of a slicer bistable devices 40a and b may each comprise a Schmitt trigger device or a squaring amplifier, and the like.

Bistable devices 40a and 40b have output signals comprising a sequence of positive mark and space DC pulses, respectively. The mark and space pulses have been processed in entirely separate, identical channels 20 and 22. Any delay or distortion caused by one channel which affects the pulses being processed therein would, in the absence of a malfunction or a design or construction error, also be present in the other channel because the channels are substantially, if not precisely, identical. For example, the corresponding stages of the two channels have the same transient response, gain, same signal to noise ratio, time delay, phase distortion, etc.

The two series of mark and space pulses from bistable devices 40a and 40b are coupled to decoder 42. Decoder 42 comprises a binary level detector 44 and a bistable latching device 46. Binary level detector 44 generates output signals which are an indication of a change in the binary level of an incoming pulse. In one example, binary level detector 44 will produce output signals indicative of each change in binary state in the mark pulses from zero to one occurring at the leading edges of mark pulses and will also produce other output signals indicating each change in binary state occurring at the trailing edges of mark pulses. Output signals from binary level detector 44 are coupled to bistable latching device 46. Bistable latching device 46 presents a binary output signal which is of one binary state or the other. Bistable latching device 46 is latched in one binary state until a signal is received from binary level detector 44 which indicates a change in the binary level of a received pulse. Continuing with the above example of output signals from detector 44 indicating the leading edge changes of state in mark pulses and at the trailing edge changes of state of mark pulses, bistable latching device 46 will change the state of its output signal to a first binary state in response to each signal from detector 44 representative of the leading edge of a mark pulse and will stay latched in that first binary state until a signal representative of the trailing edge of that mark pulse is received. Latching device 46 will change the state of its output signal to a second binary state in response to the input signal representative of the trailing edge of that mark pulse. It will stay latched in the second binary state until the next signal indicative of the leading edge of a mark pulse is received, at which time it will again change the state of its output signal to the first binary state.

The logic of bistable latching device 46 has been described above in terms of output signals from binary level detector 44 which represent changes in the binary states of information pulses in the mark channel, specifically changes occurring at the leading and trailing edges of a mark pulse. However, utilizing only the mark information is but one of four modes of operation of the preferred embodiment. Binary level detector 44 includes means for developing output signals indicative of the leading edge and trailing edge of each mark pulse received and output signals indicative of the leading and trailing edge of each space pulse received. In other words binary level detector 44 includes means for detecting each change in binary state in the series of mark pulses received and each change in binary state in the series of space pulses received including both changes from a zero to a one state and changes from a one to a zero state, where a one state is defined as the occurrence of a mark pulse and the occurrence of a space pulse, respectively.

Binary level detector 44 may comprise a means for differentiating received mark pulses and received space pulses. The differentiating means produces output signals indicative of the leading and trailing edges of each mark pulse received and of each space pulse received. Two alternate differentiating means are discussed below. In one embodiment of a differentiating means output signals from a binary level detector are AC coupled to a bistable latching device 46. In the preferred embodiment of binary level detector 44 output signals are DC coupled to bistable latching device 46.

Binary level detector 44 includes a switch means for coupling selected combinations of output signals indicative of the leading and trailing edges of received mark and space pulses. In the preferred embodiment there are four modes of operation: mark only (IA); space only (IB); mark-space (IC) and mark-space diversity (ID).

In the mark only mode of operation (IA) output signals representative of the leading and trailing edges of each received mark pulse are coupled to bistable latching device 46. In the space only mode of operation (IB) output signals representative of the leading and trailing edges of each received space pulse are coupled to bistable latching device 46. In the mark-space mode of operation (IC) output signals representative of the leading edges of each received mark pulse and each received space pulse are coupled to bistable latching device 46. In the mark-space diversity mode of operation (ID) output signals representative of the leading and trailing edges of each received mark pulse and each received space pulse are coupled to bistable latching device 46. Because the sequence of mark and space pulses are normally complementary wave forms, an output signal indicative of the trailing edge of a mark pulse should be substantially coincident with an output signal indicative of the leading edge of a space pulse. Similarly, an output signal indicative of the trailing edge of a space pulse should be substantially coincident with an output signal indicative of the leading edge of a mark pulse. If stretching of a mark pulse or a space pulse occurs because of distortion due to multiple path propagation of the pulse or for any other reason, the normally coincident pulses will occur at different times.

In the mark-space diversity mode of operation (ID) bistable latching device 46 changes the binary state of its output signal in response to either an output signal from detector 44 representative of the leading edge of a space pulse or to an output signal representative of the trailing edge of a mark pulse. The second of these two pulses to arrive does not change the output of latching device 46 as device 46 is latched in one binary state until the arrival of either one of two additional output signals. Next, either an output signal representative of the leading edge of a mark signal or an output signal representative of the trailing edge of a space signal will cause bistable latching device 46 to change the binary state of its output signal. Whichever of these two signals arrives later in time will have no effect upon the binary state of the output signal. Latching device 46 will not change the binary state of its output signal again until a signal representative of either the trailing edge of a mark pulse or the leading edge of a space pulse is received from detector 44.

Latching device 46 may be any well-known bistable device adapted to the logic for latching discussed above. For example, it may be a bistable multivibrator. In the alternative embodiment described herein, however, the bistable latching device comprises a pair of silicon controlled rectifier devices, known as "SCRs", coupled together by a commutating capacitor. The latching device is described in more detail below. The output signals from bistable latching device are a sequence of binary pulses where positive pulses represent mark or 1 signals and negative pulses represent space or 0 signals. The binary output signals are utilized to drive an output device.

Output device 50 is a teleprinter which is a common device for converting the binary pulses from decoder 42 into the printed word. Of course numerous types of other output devices could be utilized such as a device for converting binary signals into a visual presentation, etc. Latching device 46 drives a keyer 54 which may be a simple transistor circuit such as the circuit described on page 1.7 of The Teleprinter Handbook referenced above. Keyer 54 is connected in series in a loop circuit comprising a teleprinter 56 and a power supply 58. Teleprinter 56 converts coded pulses to the printed word. Keyer 54, teleprinter 56 and power supply 58 are connected in a wellknown loop circuit where the current in the loop is limited to a maximum of 60 milliamperes. Current is turned on and off in accordance with the make and break keying of keyer 54. Conventionally current is caused to flow in the loop by a mark pulse and is terminated by a space pulse. Teleprinter may be any teleprinter such as, for example, a Teletype Model 28 or a Kleinschmidt 311 for signals coded in a five-level Murray code or a Teletype Model 33 or 35 for signals coded in an eight-level ASCII code. Teleprinters are described in detail in The Teleprinter Handbook referenced above.

Figure 2:
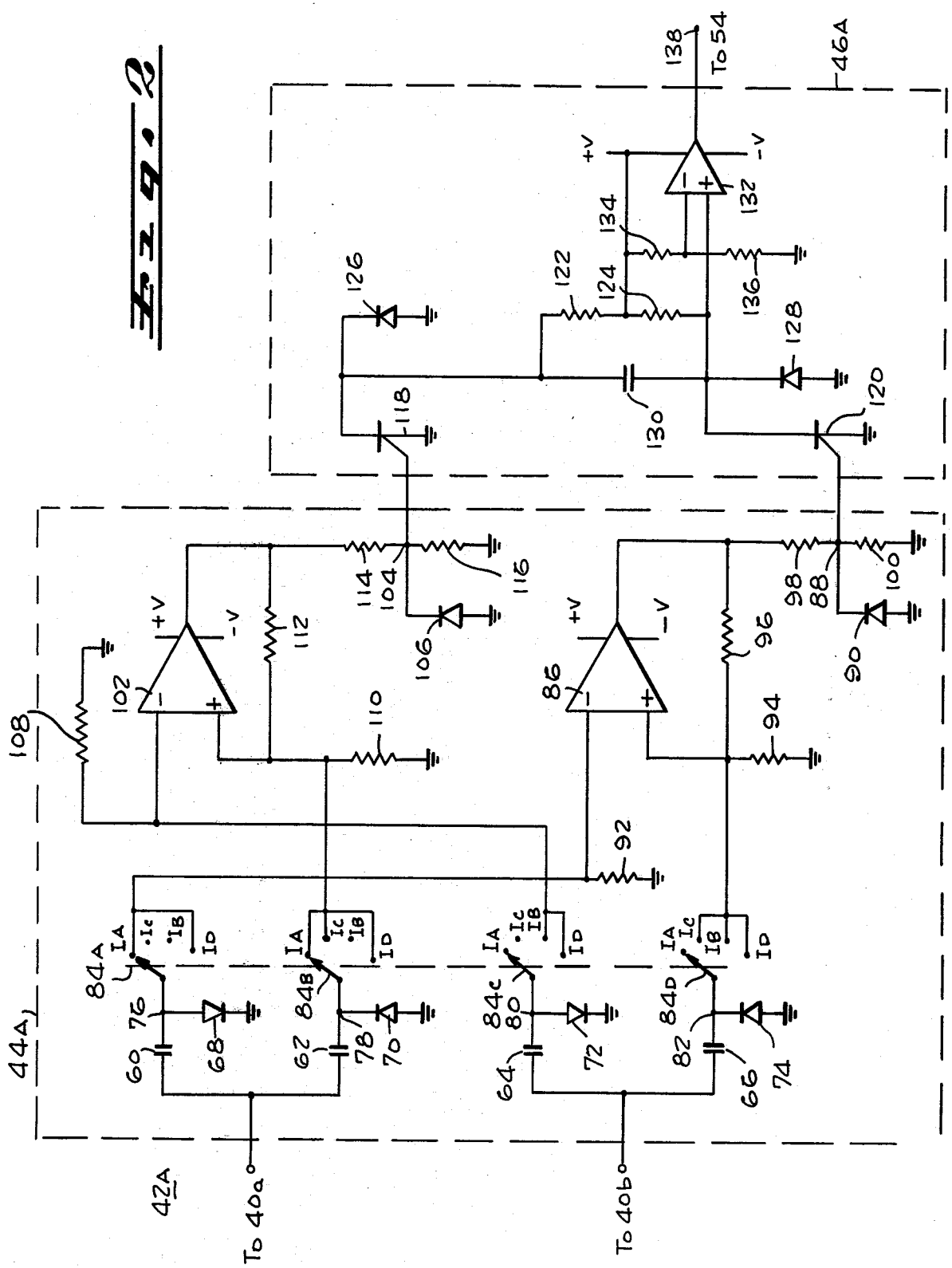
FIG. 2 is a schematic diagram showing an alternative embodiment of the novel decoder of the invention.

Consider now the detailed construction of decoder 42A. Referring to FIG. 2, there are shown therein four capacitors 60, 62, 64 and 66 and four diodes 68, 70, 72 and 74. Capacitors 60 and 62 differentiate each pulse in a series of pulses received from bistable device 40a in mark channel 20. Capacitor 60 is connected to ground through diode 68 so that only negative-going pulses appear at the junction 76 between capacitor 60 and diode 68. Positive pulses are blocked to nearly zero by diode 68. A sequence of negative pulses will appear at junction 76 which are indicative of the changes in binary state occurring at the trailing edges of mark pulses. In other words negative pulses appearing at junction 76 indicate the changes in binary state from 1 to 0 occurring in the mark channel.

Capacitor 62 is similarly connected to receive mark pulses from bistable device 40a. However, diode 70 is connected with the opposite polarity from that of diode 68. Thus pulses appearing at junctions 78 are positive-going pulses indicative of the leading edges of mark pulses. Negative pulses occurring at the trailing edges of mark pulses are blocked to nearly zero by diode 70.

Capacitor 64 and diode 72 are coupled to receive pulses from bistable device 40b in space channel 22. Capacitor 64 differentiates these space pulses. Only negative-going pulses are present at junction 80 because of the polarity of diode 72. The negative pulses appearing at junction 80 are representative of the trailing edges of space pulses, i.e. of the change in binary state from 1 to 0.

Capacitor 66 and diode 74 are also connected to receive and differentiate pulses received from the space channel. The polarity of diode 74 is such that only positive pulses are present at junction 82. These positive pulses are representative of changes in binary state at the leading edges of the space pulses.

Thus there are four output signals developed by the four capacitors and associated diodes. These output signals are coupled by mode switch 84 to slicers. Mode switch 84 is a switch assembly having four sections 84A, B, C and D. Mode switch section 84A is connected to junction 76 to receive negative signals from junction 76 which are representative of the trailing edges of mark pulses. Mode switch section 84B is connected to junction 78 to receive positive signals which are representative of the leading edges of mark pulses. Mode switch section 84C is connected to junction 80 to receive negative signals which are representative of the trailing edges of space pulses. Mode switch section 84D is connected to junction 82 to receive positive signals which are representative of the leading edges of space pulses.

Mode switch 84 may be switched to any one of the four modes discussed above: mark only (IA); space only (IB); mark-space (IC) or mark-space diversity (ID), wherein the notations IA, IB, IC and ID symbolize the four possible positions of mode switch 84.

With mode switch 84 in the mark only position (IA), negative pulses appearing at junction 76 are coupled, i.e. applied, to the inverting input of slicer 86. Slicer 86 is a bistable circuit of the type discussed above which will change the polarity of its output voltage in response to input signals. A negative input pulse to its inverting input causes a positive output pulse from slicer 86. The positive output pulse is presented at junction 88. Diode 90 is connected with a polarity to clamp negative-going pulses. Therefore positive pulses at junction 88 are not affected by this diode. Resistors 22 and 94 are input resistors connected to the inverting and the noninverting input terminals of slicer 86 respectively. Resistor 96 is a feedback resistor connected from the output terminal of slicer 86 to its non-inverting input terminal. A voltage divider network comprising resistors 98 and 100 is connected between the output terminal of slicer 86 and ground.

Positive pulses present at junction 78 are coupled to the non-inverting input terminal of slicer 102. A positive pulse at the non-inverting input terminal of slicer 102 causes a positive pulse to be present at the output terminal of slicer 102. Slicer 102 is identical to slicer 86. Positive pulses at the output terminal of slicer 102 are coupled to junction 104. Diode 106 clamps the output voltage of slicer 102 to zero thus preventing any negative pulses at junction 104.

At this point each positive pulse appearing at junction 88 is representative of the trailing edge of a mark pulse. Each positive pulse at junction 88 is followed by a positive pulse at junction 104 which is representative of the leading edge of a mark pulse. The signals at junctions 88 and 104 are coupled to a pair of silicon controlled rectifiers 118 and 120 in latching device 46A. Assume that silicon controlled rectifier 118 is conducting and silicon controlled rectifier 120 is non-conducting. A silicon controlled rectifier has the characteristic of staying in conduction once it is gated into conduction, even though the gating voltage is removed. The anodes of silicon controlled rectifiers 118 and 120 are connected to a positive voltage supply through resistors 122 and 124 respectively. The cathodes of silicon controlled rectifiers 118 and 120 are grounded. Diodes 126 and 128 clamp the anodes of silicon controlled rectifiers 118 and 120 to ground so that no negative voltage may appear on the anodes. The anodes of the two silicon controlled rectifiers are coupled one to another by commutating capacitor 130. A positive pulse appearing at junction 88 is coupled to the gate of silicon controlled rectifier 120 causing it to conduct. When silicon controlled rectifier 120 conducts, the voltage at its anode is substantially zero. Capacitor 130 has been charged to the magnitude of the positive supply voltage. The grounding of the anode of silicon controlled rectifier 120 clamps the anode of silicon controlled rectifier 118 to ground. Silicon controlled rectifier 118 is thus turned off. Silicon controlled rectifier 118 will stay non-conducting as long as its gate is less positive than the voltage necessary to trigger it back into conduction. The next positive pulse appearing at junction 104 will reverse the states of cnduction in silicon controlled rectifiers 118 and 120. A positive pulse at the gate of silicon controlled rectifier 118 will cause it to conduct and silicon controlled rectifier 120 will be commutated out of conduction. Thus silicon controlled rectifiers 118 and 120 operate as a latching device. Either one or the other is in a state of conduction at all times. In the mark only mode (IA) an output signal from capacitor 62 thus causes silicon controlled rectifier 118 to conduct and an output signal from capacitor 60 causes silicon controlled rectifier 120 to conduct. Each period of conduction by silicon controlled rectifier 118 corresponds to a mark pulse.

Slicer 132 couples output signals from silicon controlled rectifiers 118 and 120 to output device 50. The voltage divider network comprising resistors 134 and 136 is connected between the positive supply of voltage and ground. The voltage of the junction of these resistors is coupled to an inverting input terminal of slicer 132. This positive input voltage is inverted by slicer 132. Slicer 132 always presents a negative output voltage unless a voltage present at the non-inverting input terminal exceeds a voltage present at the inverting input terminal. The voltage at the anode of silicon controlled rectifier 120 is coupled to the non-inverting input terminal of slicer 132. The voltage at the anode of silicon controlled rectifier 120 is substantially equal to the supply voltage when silicon controlled rectifier 120 is non-conducting. This voltage exceeds the value of the voltage at the inverting input terminal and therefore causes the output of slicer 132 to become positive for as long as silicon controlled rectifier 120 remains non-conducting. Silicon controlled rectifier 120 is non-conducting when mark silicon controlled rectifier 118 is conducting. Therefore the duration of the positive output voltage from slicer 132 corresponds to the duration of a mark pulse. This mark pulse which appears at terminal 138 is coupled to the keyer circuit in output device 50. Of course, either silicon controlled rectifier may be used to drive the keyer. The opposite input terminal of slicer 132 could be connected to the anode of the mark silicon controlled rectifier 118 without inverting the output signal to the teleprinter.

With the mode selector switch 84 in the space only position (IB) negative pulses from junction 80 are coupled to the inverting input terminal of slicer 102. Positive pulses from junction 82 are coupled to the non-inverting input terminal of slicer 86. Each pulse appearing at junction 104 is a positive pulse corresponding to the trailing edge of a space pulse. Each positive pulse at junction 88 corresponds to the leading edge of a space pulse. Silicon controlled rectifier 120 is gated into conduction in the manner discussed above for the duration corresponding to the duration of a space pulse and commutated out of conduction when silicon controlled rectifier 118 is gated into conduction. Thus slicer 132 is being driven in the manner discussed above for mode IA but is now driven by information derived only from space channel 22.

With mode selector switch 84 in the mark-space mode (IC), positive pulses from junction 78, which correspond to the leading edges of mark pulses, are coupled to the non-inverting input terminal of slicer 102. Positive pulses appearing at junction 82 which correspond to the leading edges of space pulses are coupled to the non-inverting input terminal of operational amplifier 86. Each pair of consecutive positive pulses at junctions 104 and 88 represent the leading edge of a mark and a space signal respectively. Each positive pulse at junction 104 triggers silicon controlled rectifier 118 into conduction in the manner discussed above. The next positive pulse appearing at junction 88 triggers silicon controlled rectifier 120 into conduction thereby commutating silicon controlled rectifier 118 out of conduction. The voltage change at the anode of silicon controlled rectifier 120 drives slicer 132 in the manner discussed above. Thus the output signal of slicer 132 at terminal 138 is a bipolar binary signal with the positive portion representing mark signals and the negative portion representing space signals.

With mode selector switch 84 in the mark-space diversity position (ID) output signals from capacitors 60, 62, 64 and 66 are coupled to slicers 86 and 102. Pulses appearing at junctions 76 and 82 are coupled to the inverting and non-inverting input terminals of slicer 86 respectively. The inverting input terminal receives pulses from junction 76 which correspond to the trailing edges of mark pulses. Positive pulses corresponding to the leading edges of space pulses are coupled to non-inverting input terminal of slicer 86. Whichever pulse arrives first at either input of slicer 86 produces a positive output signal, i.e. a positive pulse at junction 88. The positive pulse at junction 88 drives silicon controlled rectifier 120 into conduction. Silicon controlled rectifier 120 will remain in conduction until commutated out of conduction by silicon controlled rectifier 118 regardless if slicer 86 receives another input pulse at one of its ports. Thus silicon controlled rectifier 120 is latched in its conductive state.

Pulses appearing at junctions 80 and 78 are coupled to the inverting and non-inverting input terminals of slicer 102 respectively. Negative pulses appearing at junction 80 correspond to trailing edges of space pulses. Positive pulses appearing at junction 78 correspond to the leading edges of mark pulses. Whichever of a consecutive pair of mark and space pulses at junction 78 and 80 first arrives at an input terminal of slicer 102 produces a positive output signal at junction 104. The positive output signal at junction 104 triggers silicon controlled rectifier 118 into conduction and thereby commutates silicon controlled rectifier 120 out of conduction in the manner discussed above. Silicon controlled rectifier 118 will remain in conduction until commutated out of conduction by silicon controlled rectifier 120 regardless of whether or not slicer 102 receives another input pulse before silicon controlled rectifier 120 is commutated into conduction. As silicon controlled rectifiers 118 and 120 are commutated in and out of conduction the voltage at the anode of silicon controlled rectifier 120 changes in the manner discussed above. Changing the voltage level at the anode of silicon controlled rectifier 10 produces positive and negative ouput pulses from slicer 132 in the manner discussed above.

Discussion to this point assumed that mode selector switch 34 has been in the mode I position. Assume now that mode selector switch 34 shown in FIG. 1 is switched to the mode II position. Note that the DC mark and space pulses at the output of precision detectors 30a and 30b are both coupled to operational amplifier 32a in the mark channel 20. Operational amplifier 32a, low pass filter 36a, automatic threshold corrector 38a and bistable device 40a function in the manner discussed above except that they now pass a bipolar pulse train comprised of the combined mark and space DC pulses. Pulses at the output of bistable device 40a are coupled through mode selector switch section 34b to the input terminal of output device 50 for driving keyer 54 and teleprinter 56 in the manner described above.

Referring now to FIG. 3 there is shown therein the preferred embodiment, decoder 42B. Decoder 42B comprises binary level detector 44B and bistable latching device 46B. Detector 44B is a DC coupled version of a detector which functions in the same manner as detector 44A to detect changes in binary state of mark and space pulses which occur at the leading and trailing edges of these pulses.

In utilizing decoder 42B with mark and space channels 20 and 22 described above the polarity of the output signal from bistable device 40b in space channel 22 would be reversed. Recall that for the AC coupled version of the channel 22 the inverting input of bistable device 40b would be utilized. A negative-going leading edge of a space pulse at the input terminal of bistable device 40b would produce, in that embodiment, a positive-going output signal from bistable device 40b. In the DC coupled preferred embodiment the non-inverting input terminal of bistable device 40b would be utilized so that the leadin edge of a space pulse would be a negative-going signal at its output. Recall also that the output signals from bistable devices 40a and 40b are bipolar DC pulses as shown by waveforms 323a and 323b respectively in FIG. 3 rather than unipolar DC pulses.

Diode 200 and resistor 202 are connected in series at junction 205 to receive mark pulses from bistable device 40a. Diode 200 is connected with a polarity to pass only positive pulses. Negative pulses are blocked only because of the characteristics of the particular differentiating circuits used in this embodiment. Diode 204 and resistor 206 are connected in series at junction 207 to receive space pulses from bistable device 40b at the output of channel 22. Resistors 202 and 206 are connected to ground to re-establish the ground reference for mark and space pulses appearing as voltages across these resistors. In summary, the combination of diode 200 and resistor 202 and the combination of diode 204 and resistor 206 each convert a series of bipolar pulses to unipolar pulses.

Mark pulses appearing at junction 205 are coupled to selected contacts of sections A and B of mode selector switch 208. Space pulses appearing at the junction 207 are coupled to selected contacts of sections C and D of mode selector switch 208. Mode selector switch 208 switches decoder 42B into one of the four modes of operation mentioned above: mark only (IA); space only (IB); mark-space (IC) and mark-space diversity (ID).

In the IA and ID positions of the switch, section 208B couples pulses to inverter 210. Inverter 210 is a NAND gate having its input terminals 5' and 6' connected together so that its functions as an inverter. A positive pulse at both input terminals to NAND gate 210 results in a 0, i.e. a low output. In the absence of a positive input at each input terminal of NAND gate 210, its output will be a 1, i.e. a high output.

Inverter 212 is a NAND gate which is identical to NAND gate 210 and is connected to receive pulses from mode switch 208C in switch positions IC, IB and ID.

Differentiator 214 is a differentiating circuit which responds to each positive-going input pulse to produce a short negative-going output pulse. Recall that only positive pulses are passed to differentiator 214 by diode 200. However, the change in binary state occurring at the leading edge of each mark pulse will be a signal which is positive-going signal to which differentiator 214 will respond. Capacitor 215 is a pulse-stretching capacitor included for the purpose of making the differentiated output pulse from differentiator 214 of sufficiently long duration to trigger latching device 46B into conduction without error. Differentiator 214 comprises three NAND gates connected in a differentiating circuit. Such differentiating circuits are known in the art.

Differentiator 214 comprises three dual input NAND gates connected to provide a negative-going pulse of fixed duration following each positive-going transition received at its input terminal. Each NAND gate has output signal of zero logic level only when the signal at both of its input terminals is a logic one. Each NAND gate will have an output signal of logic one in response to any other combination of input signals.

Differentiator circuit 214 generates a negative-going output signal in response to a positive-going voltage transition at its input terminal in the following manner. The initial logic state at terminal 12' will be zero level in the absence of an input signal. In response to a zero logic level at input terminal 12', the output signal at terminal 11' of NAND gate A will be a logic one. Terminal 1' of NAND gate C has a logic one at input terminal 1' and a zero logic level at input terminal 2' so the output signal at terminal 3' will be a logic one, i.e. a positive voltage. The logic one signals at termnals 3' and 11' are coupled to input terminals 8' and 9' of NAND gate B respectively. NAND gate B has an output signal of logic zero at output terminal 10' in response to two input signals of logic one.

The logic zero signal at output terminal 10' is coupled to input terminal 13' of NAND gate A. Thus differentiator 214 is set with a logic one output signal in the absence of an input signal.

When the input signal at input terminal 12' of NAND gate A changes from zero logic level to a logic one, which is a positive-going voltage transition, this change is coupled to input terminal 2' of NAND gate C. The output signal at terminal 3' of NAND gate C switches to zero logic level, i.e. zero voltage level, because its input signals are a logic one from terminal 11' of NAND gate A coupled to its terminal 1' and a logic one at its terminal 2'. The zero logic level at terminal 3' is coupled to input terminal 8' of NAND gate B. NAND gate B changes the state of its output signal at terminal 10' to logic one because one input signal is at zero logic level. The logic one at terminal 10' is coupled to input terminal 13' of NAND gate A. NAND gate A changes the state of its output signal at terminal 11' to a logic zero in response to two input signals which are logic one. NAND gate C changes its output signal at terminal 3' to a logic one in response to a logic zero at its input terminal 1' which is received from terminal 11' and in response to an input signal to differentiator 214 which is a logic one present at input terminal 2'. The duration of the negative-going pulse at terminal 3' will be determined by the propagation time of the NAND gates A, B and C and is increased by the effect of capacitor 215.

Differentiator 214 may comprise another device known in the art such as a monostable multivibrator with logic techniques incorporated to permit triggering at a positive-going voltage transition or by a negative-going voltage transistor. Such a monostable multivibrator type CD4047A is described beginning on page 233 of a handbook entitled "RCA Solid State '74 Databook Series", RCA Solid State (Box 3200), Somerville, N.J., U.S.A. 08876. Of course, the logic of converter 10 could be implemented to incorporate differentiators operating on negative-going or positive-going input signals and/or to generate negative-going or positive-going output pulses.

The RCA type CD4047A multivibrator is a CMOS digital integrated circuit. A TTL monostable multivibrator with similar logic is described beginning on page 2-112 of a handbook entitled "Signetics Digital Linear MOS", Signetics, 811 East Arques Avenue, Sunnyvale, California, U.S.A. 94086.

Differentiator 216 and its associated capacitor 217 are identical to differentiator 214 and to capacitor 215 respectively. Differentiator circuit 216 responds to the positive-going edges of pulses coupled from section B of mode selector switch 208 in the IA and ID positions of the switch and then inverted by inverter 210. These positive-going edges correspond to the trailing edges of mark pulses. Both input signals to which differentiators 214 and 216 will respond are positive-going because of the inverting action of inverter 210. Thus the pulses produced by differentiators 214 and 216 are output signals which are representative of the change in binary state which occurs at the leading and trailing edges of the mark pulses, respectively. These output pulses from differentiators 214 and 216 have a duration in the order of nanoseconds.

Differentiator circuit 218 and associated capacitor 219 are identical to differentiator circuit 214 and to capacitor 215, respectively. Differentiator 218 responds to positive-going pulses which are representative of the trailing edges of space signals received from space channel 22. Output pulses from differentiator circuit 218 are negative-going pulses which are representative of the change in binary state occurring at the trailing edges of space pulses. The output signal from each one of differentiators 214, 216 and 218 is normally a positive signal which drops approximately zero for a period in the order of 100 nanoseconds whenever the edge of a negative-going pulse is received by that differentiator.

Differentiator circuit 220 and associated capacitor 221 are also identical to differentiator circuit 214 and capacitor 215, respectively. Differentiator circuit 220 is coupled to receive space pulses from mode selector switch 208D which are inverted by inverter 212. Differentiator circuit 220 responds to the leading edges of space pulses which are positive-going signals received from bistable device 40b. The pulses received from bistable device 40b through diode 204 are positive pulses, but the signals at the leading edges of space pulses are changing state from a positive to a less positive signal and are therefore negative-going at junction 207. The pulses at junction 207 are inverted by inverter 212. The output pulses from differentiator 220 are negative-going pulses falling from a positive voltage to an approximately zero in response to the changes in binary state occurring at the leading edges of each space pulse.

Differentiator circuits 214, 216, 218 and 220 and inverter circuits 210 and 212 may all be fabricated from four Motorola integrated circuits Type MC 14011 CP, Motorola Semiconductors, Post Office Box 20912, Phoenix, Arizona, U.S.A. 85036. The input and output terminals of the individual NAND gates in FIG. 3 are numbered with primed numerals corresponding to the pin numbers of four of these Motorola integrated circuits TYpe MC 14011 CP. Each integrated circuit of this type includes four NAND gates. Of these 16 NAND gates available in four units of this type, 14 NAND gates are required for the differentiating circuits and the inverters. The two remaining NAND gates may be utilized into the construction of bistable latching device 46B discussed below. Differentiating circuits constructed from CMOS integrated circuits in the manner shown in FIG. 3 are digital devices which do not directly couple an incoming signal in producing an output signal and are therefore less sensitive to noise than the capacitor type differentiating circuits utilized in decoder 42A. Also, utilization of CMOS integrated circuits is compatible with use of integrated circuits since it would not be necessary to have a second power supply with a different output voltage.

Diodes 222, 224, 226 and 228 couple output pulses from output terminal 3 of differentiator circuits 214, 216, 218 and 220, respectively. A positive supply voltage is applied to diodes 222 and 226 through resistor 230. The positive supply voltage is also applied to diodes 228 and 224 through resistor 232. Output signals from differentiators 214 and 218 are coupled to junction 234 which is one output terminal of detector 44B. Output pulses from differentiators 216 and 220 are coupled to junction 236 which is the other output terminal of detector 44B. Output signals at junction 234 may represent either the leading edges of mark pulses or the trailing edges of space pulses. Output signals at junction 236 may represent either the trailing edges or mark pulses or the leading edges of space pulses. Output signals from detector 44B appearing at junctions 234 and 236 are coupled to latching device 46B. Latching device 46B includes a pair of NAND gates 238 and 240 connected as a self-commutating bistable device. These two NAND gates are the remaining two NAND gates available in four units of the type of CMOS circuits identified as Motorola Type MC 14011 CP circuits. NAND gates 238 and 240 are coupled together so that the output signal at terminal 4 in one of them will always be a 1, i.e. a high-level signal and the output at terminal 4 of the other of them will always be a 0, i.e. a low-level signal. The NAND gates are self-commutating so that when one is gated to reverse the binary state of its output signal, the other one also reverses the binary state of its output signal. Thus the two NAND gates 238 and 240 function as a bistable latching device. In particular, in order to produce a low-level output signal from the output of terminal 4' of either NAND gate 238 or NAND gate 240, both input signals to input terminals 5' and 6' of that NAND gate must be a high-level signal. In other words, if terminals 5' and 6' both receive a 1 signal the output signal at terminal 4' in NAND logic will be 0. Any other combination of input signals such as a 0 at either one or both of the input terminals will result in a high-level output signal in NAND logic. Of course, this latching device could be implemented in other logic or another latching device could be utilized, such as a bistable multivibrator or latching device 46A as described above. The signals at junctions 234 and 236 could be inverted to drive latching device 46A. Alternatively, bistable latching device 46 may comprise an integrated circuit latch. The RCA and Signetics handbooks referenced above include such latching devices.

NAND gates 238 and 240 set in opposite binary states upon application of a positive supply of voltage to them. One of them presents a high output signal and the other presents a low output signal. Either one of them may be set in a high state upon application of power and in the absence of input signals from detector 44B. For example, a positive supply voltage is applied to input terminal 5' of NAND gate 238 through resistor 230 and to input terminal 6' of NAND gate 240 through resistor 232. Since there is no input voltage to the other input terminal of either NAND gate, assume NAND gate 240 will set high at its output terminal 4'. This high output level approaching that of the supply level is coupled to the input terminal 6' of NAND gate 238. In this example there now would be a high input at both input terminals of NAND gate 238 resulting in a low output signal at its output terminal 4'. This low output signal at the output terminal of NAND gate 238 is coupled to the input terminal 5' of the NAND gate 240. Thus, the conditions are met for setting one of them with a high level ouput signal and the other with a low level output signal. NAND gate 238 is initially set with a low output level. This output level is coupled to a contact of sense switch 241 and through the switch to the non-inverting input terminal of slicer 242.

Slicer 242 receives a positive input voltage dropped from the supply level by resistors 244 and 246. When the voltage level at the non-inverting input terminal is less than the voltage level at the inverting input terminal, the output from slicer 242 at junction 248 will be negative. When NAND gates 238 and 240 are set oppositely, so that the output signal at terminal 4' of NAND gate 238 is low, the voltage at the non-inverting input terminal of slicer 242 will be less than the positive input voltage at its inverting input terminal. A reversal of input levels to slicer 242 from NAND gate 238 will cause the output signal at junction 248 to become positive.

Sense switch 241 is used to reverse the polarity of mark and space signals sent to an output device such as a teleprinter in the event the output device prints "upside down". The polarity of the mark and space output signals at junction 248 will depend upon the magnitudes of the radio frequencies used to transmit the mark and space signals. In some radio teletype services the mark signal is transmitted on the higher of the two frequencies and in other radio teletype services the space signal is transmitted on the higher of the two frequencies. On page 11.1 of The Teleprinter Handbook there is a discussion of maintaining correct shift polarity by the use of a reversing switch.

Consider now the operation of the novel converter of the invention. Decoder 42 has four modes of operation. The four modes of operation of decoder 42 are the mark only mode (IA), the space only mode (IB), the mark-space mode (IC) and the mark-space diversity mode (ID) of operation. In addition, the converter shown in FIG. 1 has a mode of operation wherein the information in the mark and space channels at the outputs of the precision detectors is summed together and the resulting signal is filtered, passed through an automatic threshold corrector, and applied to a bistable device for shaping the signal to substantially squarewave pulses. The bistable device, in turn, drives an output device.

In the mark only (IA) mode leading and trailing edges of mark pulses are detected by differentiating as discussed above. The mark only mode is used when single channel copy is desirable such as when the space channel is not being transmitted, when make and break keying is in use, or when the space channel is lost in interference or heavy noise or splatter from adjacent channel operation, or if the spare channel is distorted by a malfunction at the transmitter location.

The space only mode of operation (IB) is identical to the mark only mode of operation except that leading and trailing edges of space pulses are differentiated and used to drive the output device. The space only mode of operation is used when mark information is not being transmitted or when the mark signal is lost due to one of the above reasons.

In the mark-space mode of operation (IC) the leading edges of both mark and space pulses are differentiated for driving bistable latching device 46. The trailing edges are not utilized in this mode. The mark space mode is used when it is advantageous to operate from only the leading edge of the mark and space pulses. For example, this mode would be used when signals in a transmission channel experience phase cancellation which creates holes or gaps in the middle of a pulse. Recall that the trailing edge information is inhibited in the mark-space mode. Commutation of silicon controlled rectifiers 118 and 120 in latching device 46A and NAND gates 238 and 240 in latching device 46B can only take place when leading edge information is received from binary level detector 44. If leading edge information from a mark pulse has gated on the mark silicon controlled rectifier 118, the trailing edge pulse information from this mark pulse is not utilized and silicon controlled rectifier 118 will continue to conduct until a signal representing the leading edge of the next space pulse gates space silicon controlled rectifier 120 into conduction. In the event there is a gap in a pulse due to the phase cancellation, the second leading edge information pulse generated by binary level detector 44 has no effect. For example, if mark silicon controlled rectifier 118 is caused to conduct by a mark pulse having a gap in it, the trailing edge pulse generated by the gap in the mark pulse has no effect, as pointed out above, and the second leading edge information pulse occurring at the end of the gap also has no effect because mark silicon controlled rectifier 118 is latched in conduction.

In the mark-space diversity mode of operation (ID) leading and trailing edges of both the mark and space pulses are differentiated to drive bistable latching device 46. The mark-space diversity mode is used in the presence of selective fading, that is where the mark channel is fading at a different rate from the space channel. Such fading is a common occurrence when frequency shift keying between frequencies spaced more than 100 Hz apart. One of the common frequency shifts is between frequencies 850 Hz apart. In a standard amplitude modulated diversity terminal unit, i.e. a converter, an automatic threshold corrector provides diversity capabilities. That is, the automatic threshold corrector maintains a decision point substantially halfway between the positive and negative levels of the mark and space pulses. The automatic threshold corrector is a device that permits copying only the mark information or only the space information. This capability is commonly called "single channel", i.e. in-band diversity operation during selective fades. The dual automatic threshold correctors described above provide in-band diversity in the mark-space diversity mode of operation. In-band diversity means that if either of the mark or the space channel information is lost due to selective fading, or other reasons, decoder 42 will automatically continue to function properly from single channel information.

The modes of operation of the converter unit will now be described with reference to FIG. 1. The block diagram shown in FIG. 1 includes timing signals associated with some of the blocks but not for binary level detector 44 and bistable latching device 46 in decoder 42. There follows a brief summary of the operation of the converter unit in mode II where mark and space information is summed after it is detected. Recall that in this mode of operation information flow bypasses decoder 42. The operation in mode II is illustrated in terms using the example of a normal mark and space pulse where neither pulse has any distortion and both pulses have adequate signal strength. Mode II may be used where pulses having such characteristics are present. The presence of strong undistorted pulses in mode II has the advantage that information in both the mark and space channels is summed to produce a bipolar waveform having better signal strength levels than the same information in separate mark and space channels would have.

The mark-space diversity mode of operation ID is the preferred mode of operation over the mark only and space only modes because signals are automatically generated by differentiators 214, 216, 218 and 220 in response to the changes in binary state occurring at the leading and trailing edges of whichever mark and space pulses are received by decoder 42. That is, if in this ID mode either the mark or space pulses are received, signal representative of the information at the leading and trailing edges of these pulses may be generated. If both mark and space signals are received, redundant signals are generated. The mark-space diversity mode (ID) is also preferred over the mode II which is also a mode capable of diversity operation. Diversity operation means that the coverter will continue to generate an output signal if either the mark or the space signals are not received. The mark-space diversity mode has the advantages of being capable of such diversity operation and also preventing errors in decoding due to distorted, overlapping mark and space pulses by operating on information at the leading and trailing edges of mark and space signals. In mode II any overlapping portions of mark and space pulses are cancelled in the process of combining the two series of pulses.

Mode selection may be based on the quality of the incoming mark and space signals. The quality of the mark and space signals may be determined by listening to the mark and space signal tones with a loudspeaker (not shown) or the like, by displaying the mark and space signals with an oscilloscope (not shown) or by observing the quality of reproduced alphanumeric information from an output device such as a teleprinter.

A pulse is received at inut 11 of high pass filter 12. The mark portion of the pulse is illustrated by waveform 300 and may have a frequency, for example, of 2125 Hz. The space portion of the signal follows immediately at a frequency of 2975 Hz as illustrated by waveform 302. Both the mark and the space pulses are directed through filters 12 and 14 to mixer 24a and to 24b. Mixer 24a mixes both the incoming mark and space signals with a signal from variable frequency oscillator 26a having a frequency selected to produce an output mark signal from mixer 24a having a frequency of 750 Hz. For the example shown, variable frequency oscillator 26a would be adjusted to a frequency of 2875 Hz.

Similarly, mixer 24b mixes the incoming mark and space signals with a signal from variable frequency oscillator 26b to produce a space signal having a frequency of 750 Hz. For the example shown, oscillator 26b would be adjusted to a frequency of 3725 Hz.

Channel filters 28a and 28b eliminate undesired signals and pass only the mark signal at 750 Hz and the space signal at 750 Hz respectively. The mark signal at the output of channel filter 28 is shown by wavefore 304 and the space signal by wavefore 306. Note that the signals are described as being at the same frequency but that they are displaced in time with respect to one another.

Precision detectors 30a and 30b detect the envelope of each AC signal received. Precision detector 30a produces a positive pulsating DC signal as illustrated by waveform 308 and precision detector 30b produces a negative pulsating DC signal as illustrated by waveform 310. Note that polarity is a matter of design choice. Switch 34 could have additional contacts to make it an inverting switch for routing space pulses to operational amplifier 32a and mark pulses to operational amplifier 30b in addition to its present function. Such switches are commonly used to invert mark and space signals which are sent "upside down", there is where the mark and space frequencies are reversed.

In mode II both the mark pulses and the space pulses from precision detectors 30a and 30b are coupled to operational amplifier 32a. The output signal from operational amplifier 32a is a bipolar pulse illustrated by waveform 312. The absence of a waveform at the output terminal of operational amplifier 32 is illustrated by diagram 314. Low pass filter 36a and automatic threshold corrector 38a operate on the pulses in the manner described above. The output signal from automatic threshold corrector 38a is a bipolar DC pulse illustrated by waveform 316.

Bistable device 40a is a slicer which shapes the bipolar waveform by swinging from a DC level of one polarity to the other in response to an input signal. The output signal from bistable device 40a is illustrated by waveform 318. In mode II the output signal from bistable device 40a is coupled to the input to keyer 54. Keyer 54 is gated in make and break keying by the output signal from slicer 40a. Waveform 322 illustrates the DC current in the teleprinter loop circuit.

Referring now to FIG. 4 there are shown therein waveforms which illustrate the operation of decoder 42B with information from top to bottom in each of the several columns illustrating a progression of signals through the device and information in the various rows from right to left illustrating typical signals at specified points in a converter unit as a function of time with the elapse of time illustrated from left to right.

Assume that the mode selector switch 34 is in the mode I position. In mode I, mark and space pulses are separately processed through channels 20 and 22, respectively, in the manner discussed above for the various stages of each channel and will appear at the outputs of bistable devices 40a and 40b as bipolar pulses as illustrated by waveforms 323a and 323b respectively in FIG. 3.

The full duration of each pulse shortened by the mode switching described below is shown in FIG. 4 in dotted lines.

Mode switch 208 in detector 44B may be switched to any one of the four modes discussed above: mark only (IA); space only (IB); mark-space (IC) or mark-space diversity (ID).

With mode switch 208 in the mark only position (IA), a unipolar positive mark pulse 324 appearing at junction 205 has a positive-going leading edge and a negative-going trailing edge. Section A of mode switch 208 couples this mark pulse to the input terminal of differentiator 214. The input pulse 326 to differentiator 214 comprises a positive pulse having a leading edge which is positive-going and a trailing edge which is negative-going. Differentiator 214 responds to the positive-going leading edge of mark pulse 326 to generate a negative-going spike 238 output signal from differentiator 214. Differentiator 214 does not respond to the negative-going trailing edge of mark pulses.

The mark pulse 324 also received by inverter 210 is a positive pulse 330 having a positive-going edge and a negative-going trailing edge. Pulse 324 is inverted by inverter 210 to produce pulse 330. Differentiator 216 responds to the positive-going trailing edges of mark pulse 324 to produce a negative-going pulse 332. Differentiator 216 does not respond to the negative-going leading edges of the mark pulses appearing at its input terminal.

At junctions 234 and 236 there appear two negative-going pulse spikes 334 and 336 representative of the leading and trailing edge of mark pulse 324 respectively. Pulse 334 is coupled to input terminal 5' of NAND gate 238. Pulse 336 is coupled to input terminal 6' of NAND gate 240. Assume that NAND gate 238 has a low or "zero" output signal at output terminal 4'. This means that there must be a high level signal at input 6' and the supply voltage will be present at input terminal 5'. Negative-going pulse spike 334 from differentiator 214 which is representative of the leading edge of a mark pulse will be passed by capacitor 222 and will momentarily drive the voltage at input terminal 5' of NAND gate 238 to approximately zero. This momentary drop in voltage is enough to cause the output state of NAND gate 238 to switch to the opposite binary state, i.e. the high pulse 338. This high level voltage is applied to input terminal 5' of NAND gate 240. Since the supply voltage is present at input terminal 6' of NAND gate 240, NAND gate 240 now switches from a high output signal to a low pulse 340'. The change in binary state appearing at the output terminal 4' of NAND gate 238 is coupled to the non-inverting input terminal of slicer 242 and a similar change in binary state from a low to a high level appears at junction 248, pulse 342. The next negative-going pulse appearing at junction 236, i.e. pulse 336, will momentarily cause the voltage at input terminal 6' of NAND gate 240 to drop to approximately zero, thereby causing NAND gate 240 to reverse its binary output state from the low to the high level, pulse 344. Switching the binary state of NAND gate 240 causes NAND gate 238 to switch its binary state in the manner discussed above. The change in binary state from the high to a low level, pulse 346, is coupled through switch 241 to the non-inverting input terminal of slicer 242 and therefore appears at junction 248 as a change in binary state from a high to a low level, pulse 348.

Now assume that mode switch 208 is in the IB position. Bipolar space pulses received by detector 44B have negative-going leading edges and positive-going trailing edges. These pulses are coupled to inverter 212 and to differentiator 218 by mode switch sections 208D and 208C respectively. Diode 204 blocks the negative portions of these space pulses so that a space pulse 350 at junction 207 appears as the period between a positive pulse with a trailing edge which is negative-going and the next positive pulse with a leading edge which is positive-going. In other words, the space pulse at this point is actually an off period of no voltage between a preceding and a following positive pulse. The trailing edge of this off period is therefore a positive-going leading edge of the next positive pulse. Inverter 212 inverts pulse 350 thereby causing space pulse 351 to be a positive pulse once more rather than an off period. The leading edge of this space pulse 351 is a positive-going voltage and the trailing edge of this pulse is negative-going. The input connection to differentiator 218 is directly from diode 204 so the input pulses are the off periods between the preceding positive pulse and the following positive pulse. Pulse 350 is inverted by inverter 212 to produce pulse 352. The leading edge of space pulse 352 at the input terminal of differentiator 220 would be a positive-going voltage and the trailing edge of this space pulse 352 is a negative-going voltage.

Differentiator 220 responds to a positive-going voltage to produce a negative-going spike in the same manner as differentiator 214 described above. Similarly, differentiator 218 responds to the positive-going change in voltage at the leading edge of a positive space pulse to produce a negative-going pulse spike at its output in the same manner as does differentiator 214 described above. The negative-going output signals from differentiators 218 and 220 are coupled to junctions 234 and 236 respectively. These negative-going output signals control NAND gates 238 and 240 in the same manner as do the output signals from differentiators 214 and 216.

In the foregoing example for the mode IA of this embodiment, the change of output state at junction 248 in response to the leading and trailing edge of a mark pulse 324 was described. Assume that mode switch IB was made during the next space pulse 350. Therefore the next output signal from the binary level detector 44B will be a negative-going pulse 353 from differentiator 218 which is coupled to junction 234 as pulse 354. This output signal 354 corresponds to the trailing edge of that space pulse 350 during which the assumed mode switching was made. NAND gate 238 will, in this continuing example, have been switched back to the state where its output is low because both its input voltages are high. Arrival of pulse 354 representative of the trailing edge of a space pulse momentarily drops the voltage level at input 5' of NAND gate 238 to approximately zero which, in turn, caues NAND gate 238 to reverse its binary state to pulse 355 in the manner described above. NAND gate 240 will, in response to the change of state of NAND gate 238, change its binary state to pulse 356 in the manner discussed above. Slicer 242 changes the state of its output signal to pulse 358, in response to pulse 355.

The next output signal from detector 44B is a negative-going pulse spike 360 appearing at junction 236. This next output signal represents a change in the binary state occurring at the leading edge of the next space pulse 361 at junction 207. Output signal 360 causes NAND gate 240 to change its output state to pulse 362 which, in turn, causes NAND gate 238 and slicer 242 to reverse the binary state of their output signals to pulses 364 and 366 respectively in the manner discussed above. Thus differentiating action of binary level detector 44B and the commutating action of bistable latching device 46B have been described for the space only mode (IB).

Assume now that the mode switch 208 is changed to the mark-space mode (IC) during the space pulse 361. In this continuing example, NAND gates 238 and 240 will have been set so that NAND gate 238 has a low output pulse 364 and NAND gate 240 has a high output pulse 362. The next output signal at junction 234 from binary level detector 44B will be a negative-going pulse spike 368 from differentiator 214 which is representative of the leading edge of a mark pulse 370 at junction 205. Note that the input to differentiator 218 is grounded so that there can be no output signals from this differentiator in mode IC which are representative of the trailing edges of space pulses. Negative-going pulse spike 368 is coupled to junction 234 as pulse 372. Pulse 372 in this example causes NAND gate 238 to change the state of its output signal to pulse 374 in the manner described above and, consequently, NAND gate 240 and slicer 242 change the binary state of their binary signals to pulses 376 and 378, respectively, in the manner discussed above. Continuing with the example in mode IC, the next output signal from detector 44B will be a negative-going spike 380 from differentiator 220 representative of the leading edge of the next space pulse 382. There can be no output signal from differentiator 216 corresponding to the trailing edge of the mark pulse in this mode because the input signal of inverter 210 is grounded by mode selector switch 208B. This negative-going pulse spike 380 is coupled to junction 236 as pulse 384 and causes NAND gate 240 to reverse the binary state of its output signal to pulse 386 in the manner described above. Pulse 386, in turn, causes NAND gate 238 and slicer 242 to reverse the respective states of their output signals to pulses 388 and 390, respectively, in the manner described above. Thus NAND gates 238 and 240 have been caused to reverse their binary states once in response to an output signal 372 from detector 44B representative of the leading edge of a mark pulse 370 and a second time in response to an output signal 384 from binary detector 44B representative of the leading edge of the next space pulse 382. In this example, NAND gate 238 now has its original low output state at pulse 388 and NAND gate 240 has its original high output state at pulse 386.

Assume now that the switch 208 is switched to mode ID during space pulse 382 which appears at junction 207. In mode ID all four differentiators 214, 216, 218 and 220 receive input signals from mode selector switch 208. Inverter 210 and differentiators 214 and 216 operate as described above for mode IA. Inverter 212 and differentiators 218 and 220 operate as described above for mode IB. Note that signals 392 and 394 from differentiators 214 and 218 respectively are representative of the leading edge of mark pulse 396 and representative of the trailing edge of space pulse 382 respectively and are both coupled to junction 234 as pulse 398. Similarly signals 400 and 402 from differentiators 216 and 220 respectively are representative of the trailing edge of mark pulse 396 and the leading edge of space pulse 404 and are both coupled to junction 236 as pulse 406. Continuing with the example, negative-going output signal 398 appearing at junction 234 will cause NAND gate 238 to change the binary state of its output signal to pulse 408. This negative-going pulse spike 398 could be received from differentiator 214 in which case it would correspond to the leading edge of the next consecutive mark pulse 396 or it could be received from differentiator 218 in which case it would correspond to the trailing edge of the space pulse 382 appearing when the hypothetical switch to mode ID was made. If there is no distortion of the mark and space signals, these negative-going pulse spikes 392 and 394 from differentiators 214 and 218 will be substantially coincident at junction 234 as pulse 398. If there is distortion, such as pulse stretching due to multiple reception paths, the first of these two output signals 392 and 394 to arrive at junction 234 as pulse 398 will cause NAND gate 238 to change the state of its output signal. Pulse 410 appears at junction 248 in response to the change of binary state of NAND gate 238. Similarly, the first of pulses 400 and 402 to arrive at junction 236 as pulse 406 will cause the NAND gate 240 to reverse the state of its output signal to pulse 412.

Mark pulse 414, as it appears at junction 205, is a stretched pulse which overlaps space pulse 416 which appears at junction 207. As pointed out above, such stretching of pulses could occur because of multiple reception paths. Similarly, space pulse 416 is stretched beyond its normal period so that it overlaps mark pulse 417 appearing at junction 205. The overlapping of mark pulse 414 and space pulse 416 results in a negative-going pulse 418 and a negative-going pulse 420 both appearing at junction 236. Negative-going pulse 418 represents the leading edge of space pulse 416 and negative-going pulse 420 represents the trailing edge of mark pulse 414. The first of these two pulses to occur, pulse 418, will cause NAND gate 240 to change its binary state to pulse 422 in the manner discussed above. NAND gate 240 will not respond to pulse 420. Similarly, the overlapping of consecutive space pulse 416 and mark pulse 417 results in a pair of consecutive pulses 424 and 426 appearing at junction 234. Pulse 424 corresponds to the leading edge of mark pulse 417 and pulse 426 corresponds to the trailing edge of space pulse 416. The first of these two pulses 424 and 426 to arrive at junction 234, namely pulse 424, causes NAND gate 238 to reverse its binary state to pulse 428. Thus decoder 42B in the mark-space diversity mode (ID) has produced output signals without distortion even though the input signals were distorted by stretching.

The mark-space mode (IC) may also be used when pulse stretching of the input pulse occurs. Mark pulse 430 overlaps space pulse 432. Operation of the decoder unit 42B in the manner described above results in a pair of pulses 434 and 436 appearing at junctions 234 and 236 respectively. Pulse 434 represents the leading edge of mark pulse 430. Pulse 436 represents the leading edge of space pulse 432. Since the trailing edge information of mark pulse 430 is not used in mode IC, no differentiated pulse corresponding to the stretched trailing edge of mark pulse 430 appears at junction 234. Pulse 434 causes NAND gate 238 to reverse its state of its output signal to pulse 438. Pulse 436 causes NAND gate 240 to reverse its state of its output signal to pulse 440. Since the trailing edge information of space pulse 432 is not used in mode IC, no differentiated pulse corresponding to the trailing edge of space pulse 432 would appear at junction 236. Thus the mark space mode has produced an undistorted output signal while operating on input signals which are distorted by pulse stretching.

Decoder 42 also operates when information in one channel is missing. Waveform 442 is shown in phantom at the output of detector 30b to illustrate the absence of a space signal that was not received. Mark pulse 444 is illustrated as being received without distortion. If the absence of signal 442 were due to the fact that only mark information were being sent, mode IA could be used. If the absence of pulse 442 were due to selective fading first in the space channel and then in the mark channel, etc., mode ID would be used. The leading edge of mark pulse 444 results in a negative-going pulse 446 appearing at junction 234. This negative-going spike 446 causes NAND gate 238 to reverse the state of its output signal to pulse 448 in the manner discussed above. Similarly, the trailing edge of mark pulse 444 results in a negative-going spike 450 appearing at junction 236. Spike 430 causes NAND gate 240 to reverse the binary state of its output signal to pulse 452. Thus the decoder has presented output signals without distortion when operating on information present in only one of the two channels. Of course, if only the space channel were utilized to transmit information, the IB mode would be utilized to differentiate the leading and trailing edges of space pulses.

Pulse 453, shown in phantom in FIG. 4, is an input pulse to differentiator 218 in the ID mode only. The pulse 453 is produced in response to the trailing edge of space pulse 432. Pulse 453 results in an output signal at junction 234 which is coincident with pulse 446.

Decoder 42 also operates on incoming signals which have experienced phase cancellation as illustrated by mark pulse 454 and space pulse 456 appearing at the output terminals of low pass filters 36a and 36b respectively. Mark pulse 454 results in two negative-going pulse spikes 458 and 460 being produced at junction 234. Pulse 458 is representative of the leading edge of mark pulse 454 and a second pulse 460 is a spurious pulse generated because the signal input to differentiator 214, as shown by pulses 462a and b, is positive-going twice during the period of mark pulse 454. Pulses 462a and b are generated in the following manner. Mark pulse 454 falls to zero due to phase cancellation which allows slicer 40a to come out of saturation. Mark pulse 454 becomes positive again which drives slicer 40a back into saturation. Pulses 462a and b are the positive portions of the changing output of slicer 40a passed by diode 200. NAND gate 238 changes the binary state of its output signal to pulse 464 in response to pulse 458 but it will not respond to the second pulse 460. NAND gate 240 changes the binary state of its output signal to pulse 466 in response to pulse 468. Pulse 468 appears at junction 236 and is representative of the leading edge of space pulse 456. Thus the decoder has presented output signals without error while operating on input pulses which have been distorted by phase cancellation.

Other embodiments of a converter may be fabricated without departing from the scope of the invention. For example, the mixer and variable frequency oscillator may be eliminated from either mark channel 20 or space channel 22. When using only one mixer and one oscillator, the channel filter for the channel not having a mixer would be designed to pass the frequency of signals in that unmixed channel. For example, if mixer 24a and variable frequency oscillator 26a are eliminated from the embodiment shown in FIG. 1, channel filter 28a would be designed to pass audio signals of 2125 Hz for mark and space signal tones of 2125 Hz and 2975 Hz respectively. The remaining channel filter 28b in this example preferably would be designed to pass 2125 Hz to obtain the advantages of identical filters discussed above. Variable frequency oscillator would be adjusted to a frequency to produce a difference signal of 2125 Hz at the output of mixer 24b. However, the remaining channel filter could be designed to pass difference signals at some frequency other than the frequency of signals in the channel without a mixer and the remaining oscillator adjusted to produce difference signals from the remaining mixer at that frequency. In these examples of various other embodiments, decoder 42 would operate in the four modes (IA), (IB), (IC) and (ID) described above. Embodiments of decoder 42 need not be operated with channels 20 and 22 but may be operated separately. For example, in any application where a series of pulses or two series of complementary pulses are received via an information transmission channel comprising land telephone transmission lines or the like, the pulses may be distorted in time and/or in wave shape. Decoder 42 may be used in the decoding of pulses in these applications. In addition, decoder 42 may be used with pulse shaping circuits in such applications. For example, a device comprising bistable devices 40a and 40b and an embodiment of decoder 42 could be used.

Of course, some features of the novel converter could be omitted without departing from the scope of the invention. For example, the mark only mode or the space only mode or both of these modes of operation could be omitted. Also, the summing mode of operation (II) could be omitted.

Low pass filters 36a and b may each have a bandwidth other than from 0 to 43 Hz. Recall that a filter having a bandwidth of 0 to 43 Hz will pass information signals having a data rate of 75 baud, which is approximately 100 words per minute in the Murray code, and will also pass information signals at slower data rates in common use in teleprinter services. Since the novel decoder relies primarily on the leading edge of the mark and space pulses to correctly set its output latch, it has been determined that the novel decoder permits the linear phase low pass filters to be set to a roll off point of 37.5 Hz and perhaps even less, thus narrowing the bandwidth of the converter unit and reducing errors that are caused by noise that is inherent in high frequency propagation. Thus the novel decoder permits linear phase filters to be used with all of their advantages and no adverse effect from their slower roll off characteristic.

What is claimed is:

1. A frequency shift converter for converting at least first and second series of information AC signals having first and second frequencies respectively to a series of binary coded DC pulses comprising:

at least first and second demodulator channels, each demodulator channel detecting the envelope of each received information AC signal in one series of information AC signals, said first demodulator channel comprising a first mixer means for mixing two AC signals, a first oscillator means for generating a first oscillating AC signal having a first selected frequency, a first filter means for filtering AC signals, and a first demodulator means for demodulating AC signals, said first mixer means mixing first oscillating AC signal from said first oscillator means with AC signals in said first series of AC information signals to produce at least first intermediate AC signals having a first predetermined frequency, said first filter means filtering said first intermediate AC signals to pass substantially only AC signals having said first predetermined frequency, said first demodulator means detecting said filtered first intermediate AC signals to produce a first series of pulsating DC sgnals in response to said first series of information AC signals; said second demodulator channel comprising a second mixer means for mixing two AC signals, a second oscillator means for generating a second oscillating signal having a second selected frequency, a second filter means for filtering AC signals, and a second demodulator means for demodulating AC signals, said second mixer means mixing second oscillating AC signals from said second oscillator means with AC signals in said second series of information AC signals to produce at least second intermediate AC signals substantially having said first predetermined frequency, said second filter means filtering said second intermediate AC signals to pass substantially only AC signals having said first predetermined frequency, said second demodulator means detecting said filtered second intermediate AC signals to produce a second series of pulsating DC signals in response to said second series of information AC signals;

said first and second oscillating signals each having a frequency not at the mid-frequency between said first and second frequencies of said first and second information AC signals; and means for combining said series of pulsating DC signals from said demodulator channels to produce a series of binary coded DC pulses.

2. The apparatus as claimed in claim 1 wherein said first and second oscillator means are each tunable over a range of frequencies to produce first and second intermediate AC signals having respective first and second predetermined frequencies which may be independently varied over a first range of frequencies.

3. The apparatus as claimed in claim 2 wherein said first and second predetermined frequencies are any two different frequencies within said first range of frequencies and wherein said first and second oscillating means are tunable to frequencies to produce first and second intermediate AC signals having substantially the same frequency independently of the frequencies of said first and second information AC signals.

4. The apparatus as claimed in claim 1 wherein the frequencies of said first and second oscillating AC signals are both selected above or both selected below the frequencies of said first and second series of information AC signals to produce first and second intermediate AC signals from said first and second mixer means which intermediate AC signals have substantially the same predetermined frequency.

5. The apparatus as claimed in claim 4 wherein said first and second filter means have the same predetermined band pass around said same frequency of said first and second intermediate AC signals, said first filter means coupled between said first mixer means and said first demodulator means, said second filter means coupled between said second mixer means and said second demodulator means, said first and second filter means have substantially the same time delay, amplitude response and propagation characteristics in response to said first and second intermediate AC signals.

6. The apparatus as claimed in claim 5 wherein said first and second mixer means are substantially identical and wherein said first and second filter means are substantially identical for presenting substantially the same time delay, amplitude response and propagation characteristics in response to said first and second series of information AC signals.

7. The apparatus as claimed in claim 1 wherein each of said first and second filter means comprises a linear phase filter for reducing errors in said series of binary coded DC pulses caused by noise pulses in said first and second series of information AC signals.

8. The device as claimed in claim 1 further including first and second bistable devices, each said bistable device generating a binary output signal, each said bistable device changing the binary state of its output signal in response to each input signal having at least a predetermined level, said first bistable device coupled to receive said first series of pulsating DC signals from said first demodulator means, said first bistable device producing a first series of DC pulses, said first bistable device changing the binary state of its output signal in response to a change in the level of an input signal passing through said predetermined level, said first bistable device coupled to said combining means to apply said first series of DC pulses to said combining means, said second bistable device coupled to receive said second series of pulsating DC signals from said second demodulator means, said second bistable device producing a second series of DC pulses, said second bistable device changing the binary state of its output signal in response to a change in the level of an input signal passing through said predetermined level, said second bistable device coupled to said combining means to apply said second series of DC pulses to said combining means, said combining means responsive to said first and second series of DC pulses to produce said series of binary coded DC pulses.

9. The apparatus as claimed in claim 8 further including third and fourth filter means for filtering pulsating DC signals, said third filter means coupled to said first detector means to receive said first series of pulsating of DC signals, said third filter means producing said first series of DC pulses, said first bistable device coupled to said third filter means to receive said first series of DC pulses as its input signals, said fourth filter means coupled to receive said second series of pulsating DC signals from second detector means, said fourth filter means producing said second series of DC pulses, said second bistable device coupled to said fourth means to receive said second series of DC pulses from said fourth filter means as its input signals.

10. The device as claimed in claim 9 wherein said third and fourth filter means each comprise a linear phase filter for reducing errors in said series of binary coded DC pulses caused by noise pulses in said first and second series of information AC signals.

11. The device as claimed in claim 9 further including first and second automatic threshold corrector circuit means for determining the presence of an incoming signal, each said automatic threshold corrector circuit means continuously shifting a voltage threshold level between a minimum and a maximum voltage level of incoming signals, said first circuit means coupled to receive said first series of DC pulses from said third filter means, said first circuit means presenting to said first bistable device those selected ones of said first series of DC pulses exceeding in voltage amplitude the threshold voltage level of said first circuit, said second circuit means coupled to receive said second series of DC pulses from said fourth filter means, said second circuit presenting to said second bistable device those selected ones of said second series of DC pulses exceeding in voltage amplitude the voltage level of said second circuit means.

12. The apparatus as claimed in claim 1 wherein said combining means comprises a summing amplifier.

13. The apparatus as claimed in claim 1 wherein said combining means comprises:

a detecting means for detecting at least one change in the binary state of each DC pulse of said first and second series of DC pulses received by said combining means, said detecting means having at least one input terminal for receiving said first and second series of DC pulses and including means responsive to at least one pair of consecutive DC pulses for producing at least first and second signals, each said first signal representing one of the two changes in binary state made by a DC pulse of said pair of consecutive DC pulses, each said second signal representing another change in binary state made by one of the two DC pulses of said pair of consecutive DC pulses; and a generating means for generating said series of binary coded DC pulses and a means coupling said generating means to said detecting means to receive said first and second signals from said detecting means, said generating means including means responsive to each said first signal for changing the binary state of its output signal to a first binary state and including means responsive to each said second signal for changing the binary state of its output signal to a second binary state.

14. The apparatus as claimed in claim 13 each of the pulses in said first series of DC pulses is at least partially displaced in time with respect to the preceding pulse and with respect to the following pulse in said second series of DC pulses, said detecting means has a first input terminal for receiving said first series of DC pulses and a second input terminal for receiving said second series of DC pulses, each said first signal representing a change in the binary state of a pulse in said first series of DC pulses and each said control signal representing a change in the binary state of a consecutive pulse in said second series of DC pulses.

15. The apparatus as claimed in claim 14 wherein the leading edge of the second DC pulse in at least one pair of partially overlapping consecutive pulses in said first and second series of DC pulses is received by said detecting means before the trailing edge of the preceding first pulse of said pair of consecutive pulses is received by said detecting means, said detecting means producing a second signal representative of the change in binary state occurring at leading edge of said second pulse, said generating means changing the binary state of its output signal in response to the said signal responsive to the leading edge of said second overlapped pulse.

16. The apparatus as claimed in claim 14 wherein said first and second series of information AC signals are substantially complementary at a point of transmission.

17. The apparatus as claimed in claim 14 wherein each said first signal from said detecting means is representative of a change in binary state occurring at the leading edge of a pulse in said first series of DC pulses and each said second signal is representative of a change in binary state occurring at the leading edge of a pulse in said second series of DC pulses.

18. The apparatus as claimed in claim 17 wherein, in response to the reception of each DC pulse in said first series of DC pulses which partially overlaps in time the next consecutive DC pulse in said second series of DC pulses, said detecting means generates a second signal representative of the change in binary state occurring at the leading edge of the overlapped DC pulse in said second series of DC pulses prior in time to the reception by said detecting means of the trailing edge of said preceding overlapping DC pulse in said first series of DC pulses, said generating means changing the binary state of its output signal in response to said second signal.

19. The apparatus as claimed in claim 18 wherein said detecting means comprises first and second differentiating devices for differentiating each received DC pulse, said first differentiating device coupled to receive DC pulses in said first series of DC pulses and coupled to apply first signals to said generating means, said second differentiating device coupled to receive DC pulses in said second series of DC pulses and coupled to apply second signals to said generating means.

20. The apparatus as claimed in claim 18 wherein said detecting means generates a third signal in response to a change in binary state occurring at the trailing edge of each DC pulse in said first series of DC pulses, and wherein said detecting means also generates a fourth signal in response to a change in binary state occurring at the trailing edge of each DC pulse in said second series of DC pulses, said generating means coupled to said detecting means to receive said first, second, third and fourth signals, said generating means changing its output signal from a first binary state to a second binary state in response to one signal of consecutive second or third signals whichever of them occurs first in time, said generating means changing its output signal from a second binary state to a first binary state in response to one signal of each consecutive said first or fourth signals whichever of them occurs first in time.

21. The apparatus as claimed in claim 20 wherein said detecting means comprises first, second, third and fourth differentiating devices, said first and third differentiating devices each coupled to receive DC pulses in said first series of DC pulses and coupled to apply said first and third signals respectively to said generating means, said second and fourth differentiating devices each coupled to receive DC pulses in said second series of DC pulses and coupled to apply said second and fourth signals respectively to said generating means.

22. The apparatus as claimed in claim 20 wherein in response to each reception of each DC pulse in said first DC series of pulses which partially overlaps in time the next consecutive DC pulse in said second series of DC pulses, said detecting means generates a second signal representative of the change in binary state occurring at the leading edge of the overlapped DC pulse in said second series of DC pulses prior in time to generating a third signal representative of the change in binary state occurring at the trailing edge of said preceding overlapping DC pulse in said first series of DC pulses, said generating means changing the binary state of its output signal in response to said second signal responsive to the leading edge of said overlapped pulse.

23. The apparatus as claimed in claim 20 wherein in response to the reception of each DC pulse in said second series of DC pulses which partially overlaps in time the next consecutive DC pulse in said first series of DC pulses, said detecting means generates a first signal representative of the leading edge of the overlapped pulse in said first series prior in time to generating a fourth signal representative of the trailing edge of said preceding overlapping pulse in said second series of DC pulses.

24. The apparatus as claimed in claim 14 wherein each consecutive pair of said first and second signals from said detecting means are representative of the changes in binary state occurring at the leading and trailing edges of a received DC pulse respectively.

25. The apparatus as claimed in claim 24 wherein said detecting means comprises first and second differentiating devices for differentiating each received DC pulse, said first differentiating device generating said first signals and said second differentiating device generating said second signals.

26. The apparatus as claimed in claim 14 wherein said detecting means comprises a differentiating means for differentiating each DC pulse in said first and second series of DC pulses, said differentiating means producing signals which are representative of at least one change in the binary state of each DC pulse received.

27. The apparatus as claimed in claim 26 wherein said differentiating means comprises a plurality of differentiating devices for differentiating each received DC pulse, said first signals being generated by one of said plurality of differentiating devices and said second signals being generated by another one of said plurality of differentiating devices.

28. The apparatus as claimed in claim 27 wherein each said differentiating device comprises a capacitor and a diode connected in series, said capacitor differentiating received DC pulses, said diode connected to present output signals having a predetermined polarity at the junction of said capacitor and said diode.

29. The apparatus as claimed in claim 26 wherein each said differentiating device comprises a plurality of digital logic circuits for differentiating DC pulses, each one of said plurality of logic circuits responding to only one edge of each pulse to be differentiated by producing a signal.

30. The apparatus claimed in claim 14 wherein said generating means comprises a bistable latching device for producing said third series of binary DC output pulses.

31. The apparatus as claimed in claim 30 wherein said bistable latching device comprise first and second silicon controlled rectifier devices and a commutating capacitor, said first and second signals being applied to the gates of said first and second silicon controlled rectifier devices respectively, said commutating capacitor coupled between the anodes of said silicon controlled rectifier devices to cease conduction whenever the other of said silicon controlled rectifier devices is gated into conduction in response to one of said first and second signals from said detecting means.

32. The apparatus as claimed in claim 30 wherein said bistable latching device comprises at least two first and second logic gates, each said logic gate switchable from one binary state to the other, said first and second logic gates coupled to receive said first and second signals respectively, said first and second logic gates coupled together to cause one of said first and second logic gates to switch to a first binary state whenever the other of said first and second logic gates switches to a second binary state in response to one of said first and second signals.

33. A frequency shift converter for converting at least a first and a second series of information AC signals having first and second frequencies respectively to a third series of binary coded DC pulses comprising:
at least a first pair of demodulator channels for detecting the envelope of an information AC signal.
each said demodulator channel comprising:
means for generating an AC signal;

means for mixing an AC signal from said generating means with one of said first and second series of information AC signals to produce intermediate AC signals having a predetermined frequency;
means for filtering the intermediate AC signals;
means for demodulating the filtered intermediate AC signals to produce a series of DC signals;
means responsive to said series of pulsating DC signals for changing the binary state of a DC signal whenever a pulsating DC signal rises above or falls below a predetermined level;
said generating means both being tunable, the AC signal produced by the generating means in both said demodulator channels having a frequency not at the mid-frequency between said first and said second frequencies, said generating means in both said demodulator channels being tuned to produce intermediate AC signals from said mixing means in both said demodulator channels which intermediate AC signals have substantially the same predetermined frequency;
said filtering means in said demodulator channels having substantially the same time delay, amplitude response and propagation characteristics in response to said intermediate AC signals;
said demodulator channels producing a first and a second series of DC signals representative of said first and second series of information AC signals, respectively;
means for detecting at least one change in the binary state of a DC pulse, said detecting means responsive to each pair of consecutive DC pulses in said first and second series of DC pulses for producing at least first and second signals, each said first and second signal representating one of the two changes in binary state in one of the two DC pulses in each said pair of consecutive DC pulses in said first and second series of DC signals; and
means of generating a third series of binary coded DC pulses responsive to each said first signal for changing the binary state of its output signal to a first binary state and responsive to each said second signal for changing the binary state of its output signal to a second binary state.

34. A frequency shift converter for converting at least a first and a second series of information AC signals having first and second frequencies respectively to a third series of binary coded DC pulses comprising:
at least a first pair of demodulator channels for detecting the envelope of an information AC signal, each said demodulator channel comprising;
means for generating an AC signal;
means for mixing an AC signal from said generating means with one of said first and second series of information AC signals to produce intermediate AC signals having a predetermined frequency;
means for filtering the intermediate AC signals;
means for demodulating the filtered intermediate AC signals to produce a series of pulsating DC signals;
means responsive to said series of pulsating DC signals for changing the binary state of a DC signal whenever a pulsating DC signal rises above or falls below a predetermined level;
said generating means both being tunable, the AC signal produced by the generating means in both said demodulator channels havng a frequency not at the mid-frequency between said first and said second frequencies, said generating means in both said demodulator channels being tuned to produce intermediate AC signals from said mixing means in both said demodulator channels which intermediate AC signals have substantially the same predetermined frequency;
said filtering means in said demodulator channels having substantially the same time delay, amplitude response and propagation characteristics in response to said intermediate AC signals;
said demodulator channels producing a first and a second series of DC signals representative of said first and second series of information AC signals, respectively;
means for detecting changes in the binary state of DC pulse, said detecting means responsive to each pair of consecutive DC pulses in said first and second series of DC pulses for producing first, second, third and fourth signals, each said first and second signal representing one of the two changes in binary state in the first one of the two DC pulses in each said pair of consecutive DC pulses in said first and second series of DC signals, each said third and fourth signal representing one of the two changes in binary state in the second one of the two DC pulses in each said pair of consecutive pulses;
means for generating a third series of binary coded DC pulses responsive to signals from said detecting means for changing the binary state of its output signals, said last mentioned generating means changing the binary state of its output signal in response to the first occurring signal of selected ones of said first, second, third and fourth signals representative of each said pair of consecutive DC pulses, in a first mode the output state of said generating means changing to a first binary state in response to each first signal and to a second binary state in response to the following second signal, in a second mode changing to a first state in response to each first signal and changing to a second state in response to the following third signal, in a third mode changing to a first state in response to each third signal and changing to a fourth state in response to the following fourth signal, and in a fourth mode changing to a first state in response to the first occurring of a pair of consecutive second and third signals; and
means for switching said first, second, third and fourth signals, said switching means selectively controlling the application of said first and second, first and third, third and fourth and first, second third and fourth signals to said generating means for generating said third series of binary coded DC pulses.

* * * * *

UNITED STATES PATENT OFFICE
CERTIFICATE OF CORRECTION

Patent No. 4,013,965   Dated March 22, 1977

Inventor(s) James A. Scharfe, Jr.

It is certified that error appears in the above-identified patent and that said Letters Patent are hereby corrected as shown below:

Claim 14, line 34, delete "control" and add
-- second --.

Signed and Sealed this fifth Day of July 1977

[SEAL]

Attest:

RUTH C. MASON
Attesting Officer

C. MARSHALL DANN
Commissioner of Patents and Trademarks